United States Patent

Wicki et al.

[11] Patent Number: 5,892,766
[45] Date of Patent: Apr. 6, 1999

[54] METHOD AND APPARATUS FOR COORDINATING ACCESS TO AN OUTPUT OF A ROUTING DEVICE IN A PACKET SWITCHING NETWORK

[75] Inventors: Thomas Martin Wicki, Palo Alto; Jeffrey Dale Larson, San Jose; Albert Mu, Milpitas, all of Calif.

[73] Assignee: Fujitsu, Ltd., Kanagawa, Japan

[21] Appl. No.: 603,880

[22] Filed: Feb. 22, 1996

[51] Int. Cl.$^6$ ........................................................ H04T 3/14
[52] U.S. Cl. ................................................................ 370/412
[58] Field of Search ........................... 370/413, 414, 370/416, 418, 235, 236, 429, 428, 400, 401, 230, 252; 395/200.63, 200.64, 200.68, 877; 340/825.5, 825.51

[56] References Cited

U.S. PATENT DOCUMENTS

| | | | |
|---|---|---|---|
| 4,868,813 | 9/1989 | Suzuki | 370/418 |
| 5,079,762 | 1/1992 | Tanabe | 370/418 |
| 5,434,848 | 7/1995 | Chimento, Jr. et al. | |
| 5,541,919 | 7/1996 | Yong et al. | 370/416 |
| 5,555,264 | 9/1996 | Sallberg | 370/414 |
| 5,689,500 | 11/1997 | Chiussi | 370/418 |

FOREIGN PATENT DOCUMENTS 0 535 860 A2   4/1993   European Pat. Off. ........ H04L 12/56

OTHER PUBLICATIONS

Parviz Yegani, Marwan Krunz, and Herman Hughes, "Congestion Control Schemes in Priortized ATM Networks", IEEE, May 1, 1994, pp. 1169–1173.

*Primary Examiner*—Huy D. Vu
*Attorney, Agent, or Firm*—Fenwick & West, LLP

[57] ABSTRACT

Arbitration apparatus and method coordinate access to an output of a routing device in a packet switching network. Access to the output is granted to requests having the highest priority in a current arbitration cycle. For requests having the same priority, access is granted to the first of such requests received. Before granting a request, the arbitration apparatus ensures a receiving input buffer has sufficient space for a data packet, as well as any higher priority traffic.

10 Claims, 17 Drawing Sheets

| Time | $t_1$ | $t_2$ | $t_3$ | $t_4$ |
|---|---|---|---|---|
| Request Pending | 2 medium<br>1 low | 1 high<br>1 medium<br>1 low | 1 high<br>1 medium<br>1 low | 1 medium<br>1 low |
| Space Available in Receiving Input Buffer | 3 | 0 | 1 | 3 |
| Force Signal Asserted? | No | No | No | Yes |
| Port_Idle Asserted? | No | Yes | No | Yes |
| Request Granted | First medium priority request received | None | High priority request | None |

*Figure 6*

|     | | Flow Control Receiver 304A in First Router 104A | Flow Control Transmitter 305B in Second Router 104B | |
|---|---|---|---|---|
| (a) | RCFR<br>SANRR<br>BBR | 1 1 1 1 1 1<br>0 0 0 0 0 0<br>1 1 1 1 1 1 | 0 0 0 0 0 0<br>0 0 0 0 0 0 | CFR<br>NMTSR |
| (b) | RCFR<br>SANRR<br>BBR | 0 0 0 0 0 0<br>0 0 0 0 0 0<br>0 0 0 0 0 0 | 0 0 0 0 0 0<br>0 0 0 0 0 0 | CFR<br>NMTSR |
| (c) | RCFR<br>SANRR<br>BBR | 0 0 0 0 0 0<br>1 0 0 0 0 0<br>1 0 0 0 0 0 | 0 0 0 0 0 0<br>0 0 0 0 0 0 | CFR<br>NMTSR |
| (d) | RCFR<br>SANRR<br>BBR | 0 0 0 0 0 0<br>1 0 0 0 0 0<br>1 0 0 0 0 0 | 1 0 0 0 0 0<br>1 0 0 0 0 0 | CFR<br>NMTSR |
| (e) | RCFR<br>SANRR<br>BBR | 1 0 0 0 0 0<br>1 0 0 0 0 0<br>1 0 0 0 0 0 | 0 0 0 0 0 0<br>1 0 0 0 0 0 | CFR<br>NMTSR |
| (f) | RCFR<br>SANRR<br>BBR | 1 0 0 0 0 0<br>0 0 0 0 0 0<br>1 0 0 0 0 0 | 0 0 0 0 0 0<br>0 0 0 0 0 0 | CFR<br>NMTSR |
| (g) | RCFR<br>SANRR<br>BBR | 0 0 0 0 0 0<br>0 0 0 0 0 0<br>0 0 0 0 0 0 | 0 0 0 0 0 0<br>0 0 0 0 0 0 | CFR<br>NMTSR |

*Figure 15*

METHOD AND APPARATUS FOR COORDINATING ACCESS TO AN OUTPUT OF A ROUTING DEVICE IN A PACKET SWITCHING NETWORK

RELATED REFERENCES

The subject matter of this application is related to the subject matter of the following applications:

application Ser. No. 08/605,677, attorney docket number 2268, entitled "ASYNCHRONOUS PACKET SWITCHING" filed on Feb. 22,1996, by Thomas M. Wicki, Patrick J. Helland, Takeshi Shimizu, Wolf-Dietrich Weber, and Winfried W. Wilcke;

application Ser. No. 08/605,676, attorney docket number 2269, entitled "SYSTEM AND METHOD FOR DYNAMIC NETWORK TOPOLOGY EXPLORATION" filed on Feb. 22, 1996, by Thomas M. Wicki, Patrick J. Helland, Wolf-Dietrich Weber, and Winfried W. Wilcke;

application Ser. No. 08/603,921, attorney docket number 2270, entitled "LOW LATENCY, HIGH CLOCK FREQUENCY PLESIOASYNCHRONOUS PACKET-BASED CROSSBAR SWITCHING CHIP SYSTEM AND METHOD" filed on Feb. 22, 1996, by Thomas M. Wicki, Jeffrey D. Larson, Albert Mu, and Raghu Sastry;

application Ser. No. 08/604,920, attorney docket number 2272, entitled "CROSSBAR SWITCH AND METHOD WITH REDUCED VOLTAGE SWING AND NO INTERNAL BLOCKING DATA PATH" filed on Feb. 22,1996, by Albert Mu and Jeffrey D. Larson;

application Ser. No. 08/603,913, attorney docket number 2274, entitled "A PLOW CONTROL PROTOCOL SYSTEM AND METHOD" filed on Febr. 22,1996, by Thomas M. Wicki, Patrick J. Helland, Jeffrey D. Larson, Albert Mu, and Raghu Sastry, and Richard L. Schober, Jr.;

application Ser. No. 08/603,911, attorney docket number 2275, entitled "INTERCONNECT FAULT DETECTION AND LOCALIZATION METHOD AND APPARATUS" filed on Feb. 22, 1996, by Raghu Sastry, Jeffrey D. Larson, Albert Mu, John R. Slice, Richard L. Schober, Jr., and Thomas M. Wicki;

application Ser. No. 08/603,923, attorney docket number 2277, entitled, "METHOD AND APPARATUS FOR DETECTION OF ERRORS IN MULTIPLE-WORD COMMUNICATIONS" filed on Feb. 22,1996, by Thomas M. Wicki, Patrick J. Helland and Takeshi Shimizu; and application Ser. No. 08/603,882, attorney docket number 2278, entitled "CLOCKED SENSE AMPLIFIER WITH POSITIVE SOURCE FEEDBACK" filed on Feb. 22, 1996, by Albert Mu.

All of the above applications are incorporated herein by reference in their entirety.

FIELD OF THE INVENTION

This invention relates generally to an arbiter, and more specifically to an arbiter for coordination access to an output of a routing device in a packet switching network.

BACKGROUND OF THE INVENTION

Routing devices in packet switching networks route data packets from one routing device to another until the packets reach their final destination. Routing devices often receive packets at a rate that temporarily exceeds the rate at which the packets can be forwarded, and, consequently, routing devices employ arbitration schemes to determine which packets will be sent at a select time.

Packet switching networks use a variety of arbitration schemes, such as fixed priority or rotating schemes. Conventional arbitration schemes are limited, however, in that they do not ensure that the next destination routing device has capacity to receive a data packet before allowing the data packet to be outputted. Consequently, limited output resources are often wasted on transactions incapable of completion. Moreover, many conventional arbitration schemes are not easily or economically implemented in hardware, which provides for substantially higher performance than microprocessorbased schemes.

In Asynchronous Transfer Mode (ATM) networks, routing devices that estimate the storage capacity of the next destination routing device are known. The estimation is based on the available bandwidth of the network and the rate at which packets are being transmitted. This estimation method is limited, however, in that it does not keep track of the exact amount of space available in the next destination routing device, and, thus, cannot guarantee that sufficient space is available. Consequently, packets are sometimes sent to a routing device unable to receive the packet, and such errors can significantly reduce network performance. The risk of such errors is proportional to the transmission rate, and, thus, to minimize the risk, the packet transmission rate must be reduced. This limitation is particularly severe in multiprocessor-based packet switching networks because multiprocessor-based networks transmit data packets at a significantly greater rate than do ATM networks.

Moreover, when an arbiter employs a fixed priority arbitration scheme, it is desirable to ensure that sufficient space not only exists for the packet, but also for future higher priority traffic. Otherwise, lower priority traffic may delay higher priority traffic. The method used in ATM networks is limited in that it does not ensure that sufficient space exists for a higher priority packets before transmitting a lower priority packet. Therefore, a need exists for an arbitration method in a packet switching network that only allows a data packet access to an output if the next destination routing device has capacity to receive both the packet and, if applicable, future higher priority packets. Additionally, it is desirable to have an arbitration method that can be economically implemented in hardware.

SUMMARY OF THE INVENTION

The present invention provides a method and apparatus for coordinating access to an output of a routing device in a packet switching network. An arbiter of the present invention receives requests to access an output of a routing device. The arbiter selects the request having the highest priority in the current arbitration cycle, and, if there is more than one request having the highest priority, the arbiter selects the first of these requests received in time. This ensures that high priority packets will be granted first and that packets of the same priority will be transmitted in the order in which they were received. Moreover, nearly full buffers will likely be favored over nearly empty buffers because, statistically, fuller buffers tend to have older requests than nearly empty buffers. This is desirable because a routing device cannot receive packets at input ports with full buffers.

The arbiter only grants access to the output if the receiving input buffer has sufficient capacity to receive a data packet. For a high priority request, the input buffer must have enough space to store the data packet. For medium and low priority packets, the input buffer must also have sufficient space for higher priority packets. This method prevents lower priority traffic from delaying high priority traffic and prevents limited resources from being wasted on transmissions incapable of completion. The arbitration method of the present invention can be economically implemented in hardware.

BRIEF DESCRIPTION OF THE DRAWINGS

FIG. 6 is a chart illustrating examples of the arbitration method of the present invention;

FIGS. 15(a)–15(g) are examples of register values according to a preferred embodiment of the present invention.

DETAILED DESCRIPTION OF THE PREFERRED EMBODIMENT

Section I

Figure 1:
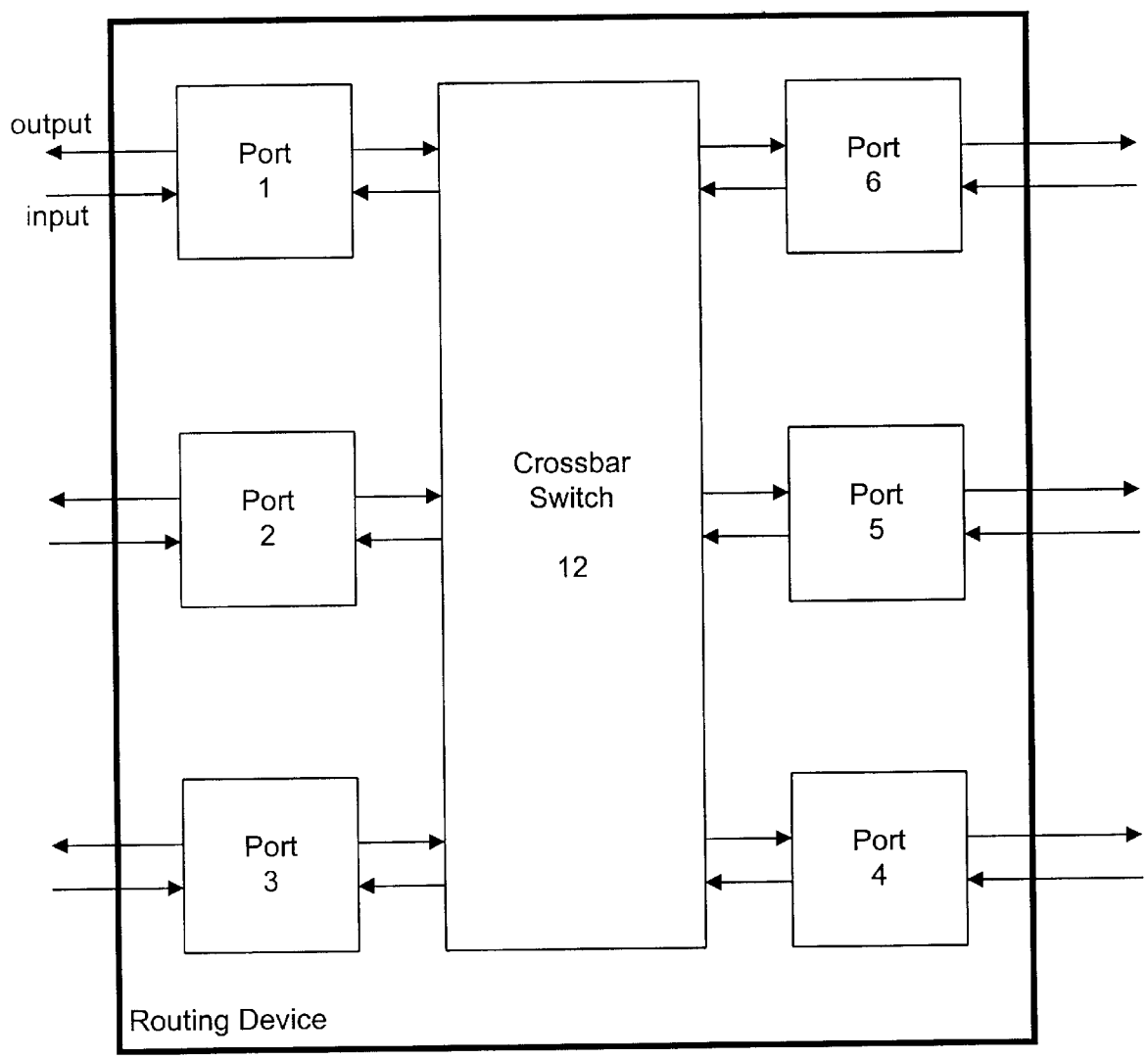
FIG. 1 is a block diagram of a first routing device according to the present invention.

FIG. 1 illustrates a block diagram of a routing device 10 according to the present invention. The routing device is part of a packet switching network, where a network of routing devices route data packets from one routing device to another until the packets reach their final destination. (Note that the data packets discussed in this application are sometimes referred to as "frames" because they include a frame header. A frame header stores information necessary to route the packet through the network.) In one embodiment, routing device 10 is used in a cache-coherent, Non-Uniform Memory Access multiprocessor system (cc NUMA).

Routing device 10 receives data packets at ports 1–6 and transmits data packets from ports 1–6. Ports 1–6 are identical, and each of the ports 1–6 is directly coupled to all the other ports, although this is not shown in FIG. 1 for simplicity. FIG. 1 illustrates six ports in the routing device 10, but it should be recognized that the number of ports can vary.

The routing device 10 routes a data packet through the packet switching network by receiving the data packet at one port and transmitting from another port. A crossbar switch 12 transfers data packets from one port to another within the routing device 10. For instance, if port 1 receives a data packet that is to be sent out port 4, the crossbar switch 12 transfers the data packet from port 1 to port 4. The crossbar switch 12 may be a conventional switch found in known routing devices, or it may be the crossbar switch disclosed in U.S. patent application, Ser. No. 08/604,920, titled "CROSSBAR SWITCH AND METHOD WITH REDUCED VOLTAGE SWING AND NO INTERNAL BLOCKING DATA PATH", filed on Feb. 22, 1966, by Jeffrey D. Larson and Albert Mu.

Figure 2:
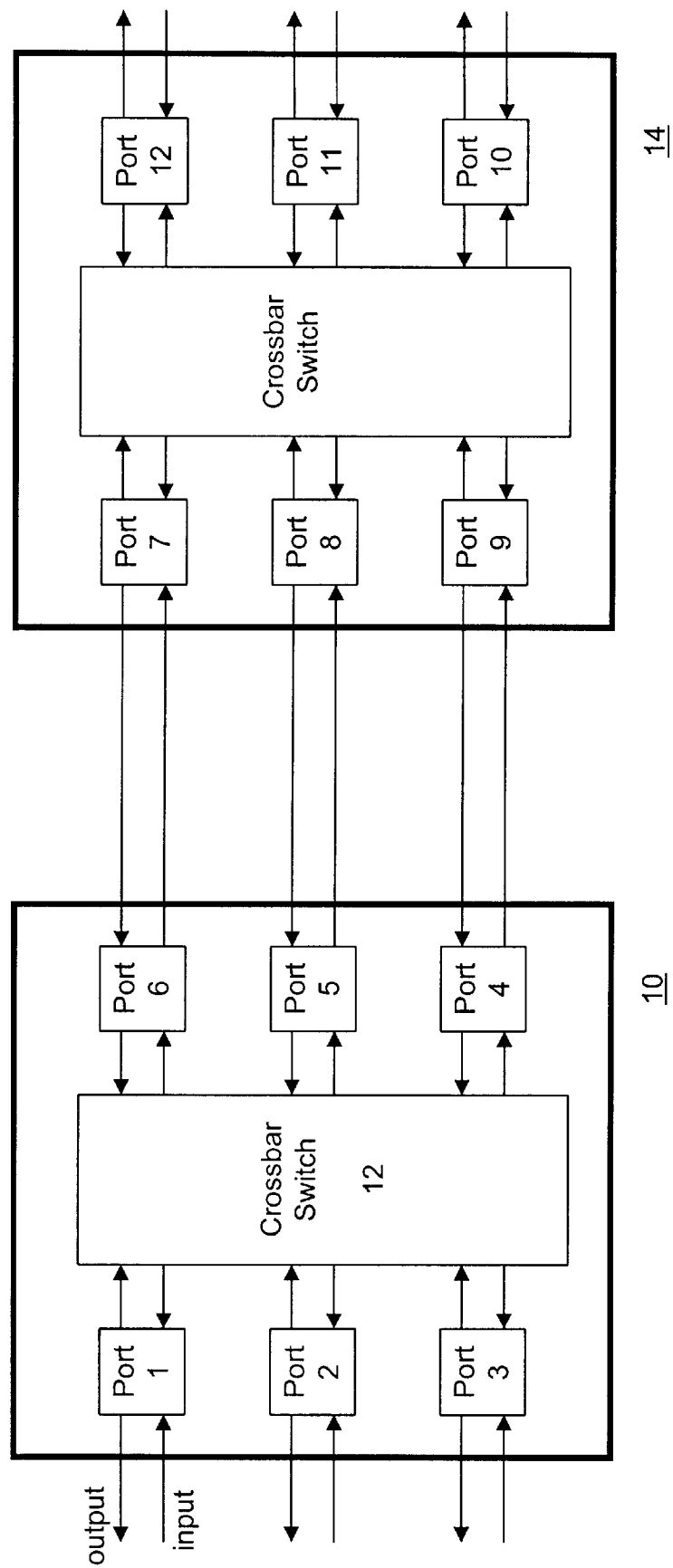
FIG. 2 is a block diagram of the first routing device and a second routing device coupled to each other according to the present invention.

FIG. 2 illustrates routing device 10 coupled to another routing device 14. Ports 7–12 in routing device 14 are identical to ports 1–6 in routing device 10. Each of the ports 1–12 has an input and an output, where the input and the output are both coupled to the same port on a routing device. For example, the input of port 6 is coupled to the output of port 7, and the output of port 6 is coupled to the input of port 7.

The operation of the ports and the arbitration method of the present invention will be described with respect to the process of routing a data packet from port 1 of routing device 10 to port 7 of routing device 14. The selection of ports 1 and 7 are arbitrary and the description of this method applies to all ports. To route a data packet from port 1 of routing device 10 to port 7 of routing device 14, routing device 10 transfers the data packet from port 1 to port 6. It then transmits the packet from port 6 to port 7.

Figure 3A:
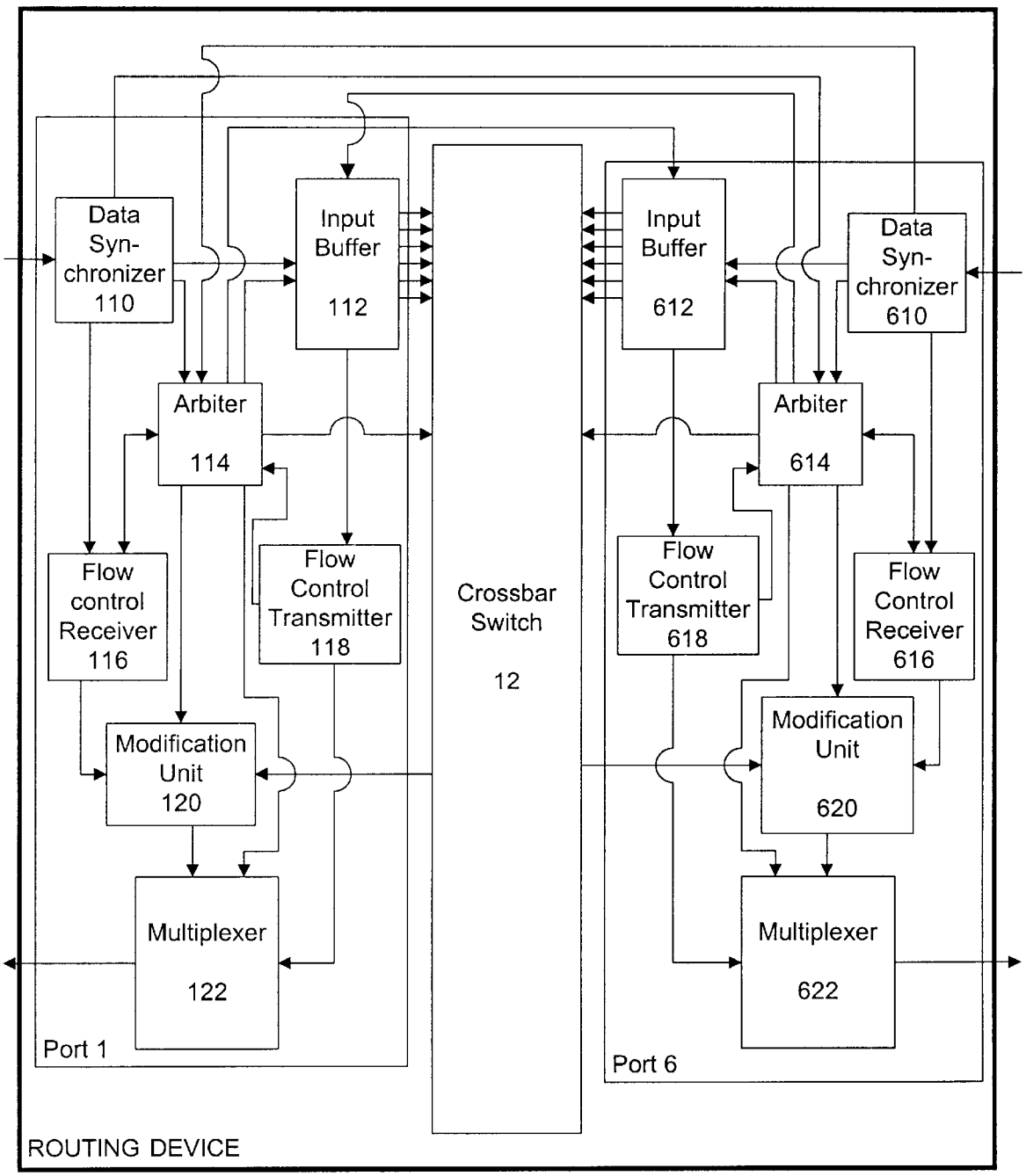
FIG. 3a is a block diagram of two ports of the first routing device according to the present invention.
Figure 3B:
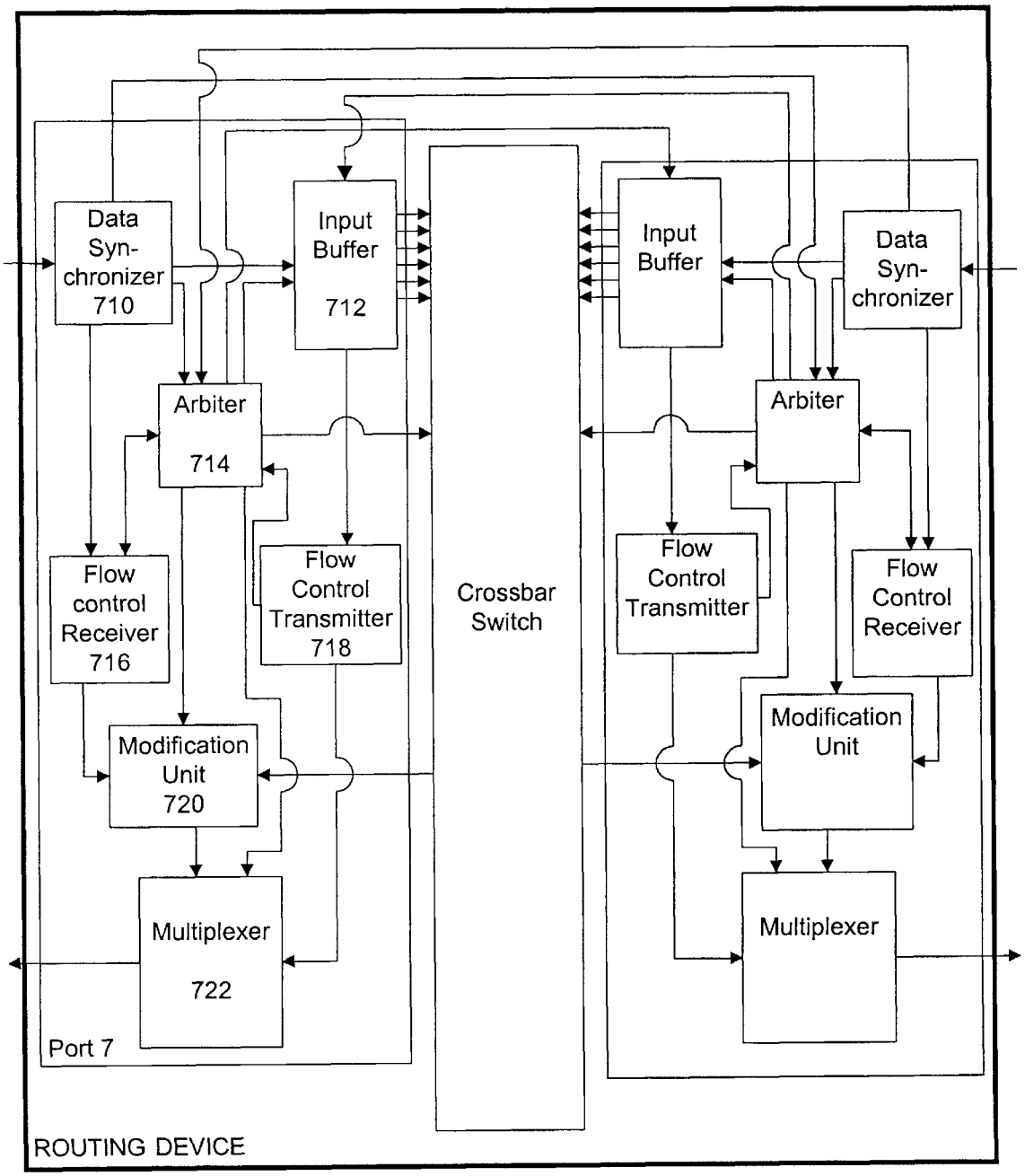
FIG. 3b is a block diagram of two ports of the second routing device according to the present invention.

FIG. 3a illustrates ports 1 and ports 6 of routing device 10, and FIG. 3b illustrates port 7 of routing device 14. Each port includes a data synchronizer, a flow control receiver unit, a flow control transmitter unit, a modification unit, a multiplexer, an input buffer, and an arbiter. Although not shown for simplicity, within a routing device each arbiter is coupled to all the input buffers and to all the data synchronizers.

Port 1 receives the data packet destined for port 7 at conventional data synchronizer 110. Data synchronizer 110 uses conventional FIFO synchronization to synchronize the frame header of the data packet to a clock signal of routing device 10. After data synchronizer 110 synchronizes the frame header, the data packet is stored in input buffer 112, which is a conventional buffer that, in one embodiment, can store six packets.

Figure 4A:
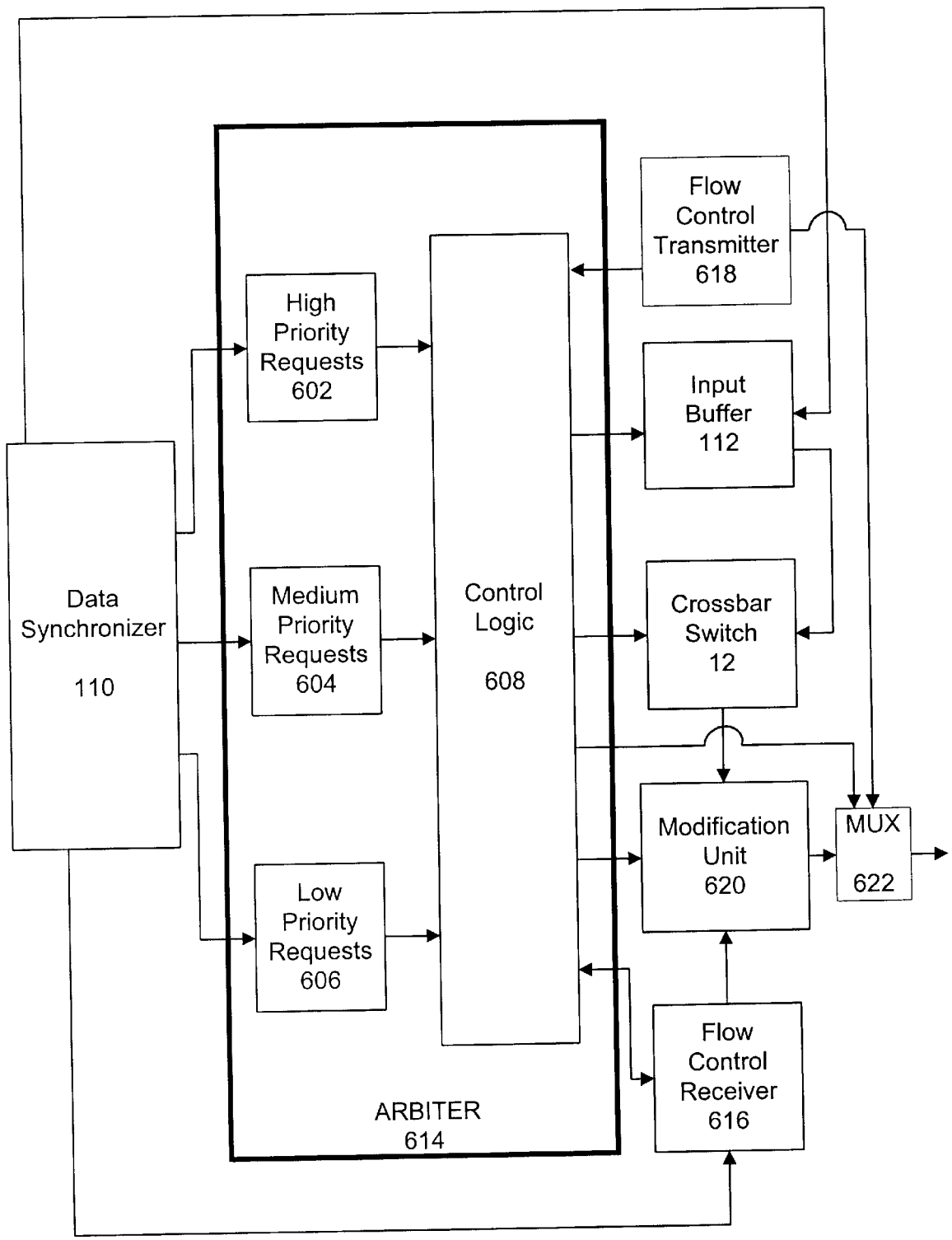
FIG. 4a is a block diagram illustrating an arbiter of the present invention.

Since port 6 is coupled to port 7, the data packet must be outputted from port 6 in order to be received at port 7. Arbiter 614, which is illustrated in FIG. 4a, controls access to the output of port 6. For simplicity, FIG. 4a only shows limited connections to arbiter 614 that are useful for discussing the routing of the data packet from port 1 to port 7. Note that an arbiter only controls access to the port in which it is located.

Arbiter 614 includes memory devices 602, 604, 606, where the number of memory devices correspond to the number of priority levels. Each of the memory devices 602, 604, 606, stores requests of one priority level. Memory device 602 stores high priority requests, memory device 604 stores medium priority requests, and memory device 606 stores low priority requests.

Arbiter 614 also includes a controller 608, which decides which of the requests to grant in accordance with the method described below and illustrated in FIG. 5, which is implemented in controller 608 using conventional logic circuitry.

In response to receiving the data packet destined for port 7, data synchronizer 110 sends a valid bit to each of the memory devices 602, 604, 606. Two of the memory devices receive a low valid bit and one of the memory devices receives a valid high bit, where arbiter 614 views the high valid bit as a request to access the output of port 6. Data synchronizer 110 sends the high valid bit to the memory device corresponding to the priority of the data packet. For instance, if the packet has a medium priority, memory device 604 receives the high valid bit and memory devices 602 and 606 receive the low valid bits.

Data synchronizer 110 also sends a number of bits to arbiter 614 indicating the address of the input buffer in which the packet is stored. The number of bits is equal to $\log_2 N$, where N is the number of buffer elements in input buffer 112. The memory device receiving the high valid bit receives the address identification bits. In one embodiment, these address identification bits are also sent to all the other memory devices in all the arbiters in routing device 10. However, the memory devices that do not receive a high valid bit do not store this information.

Figure 4B:
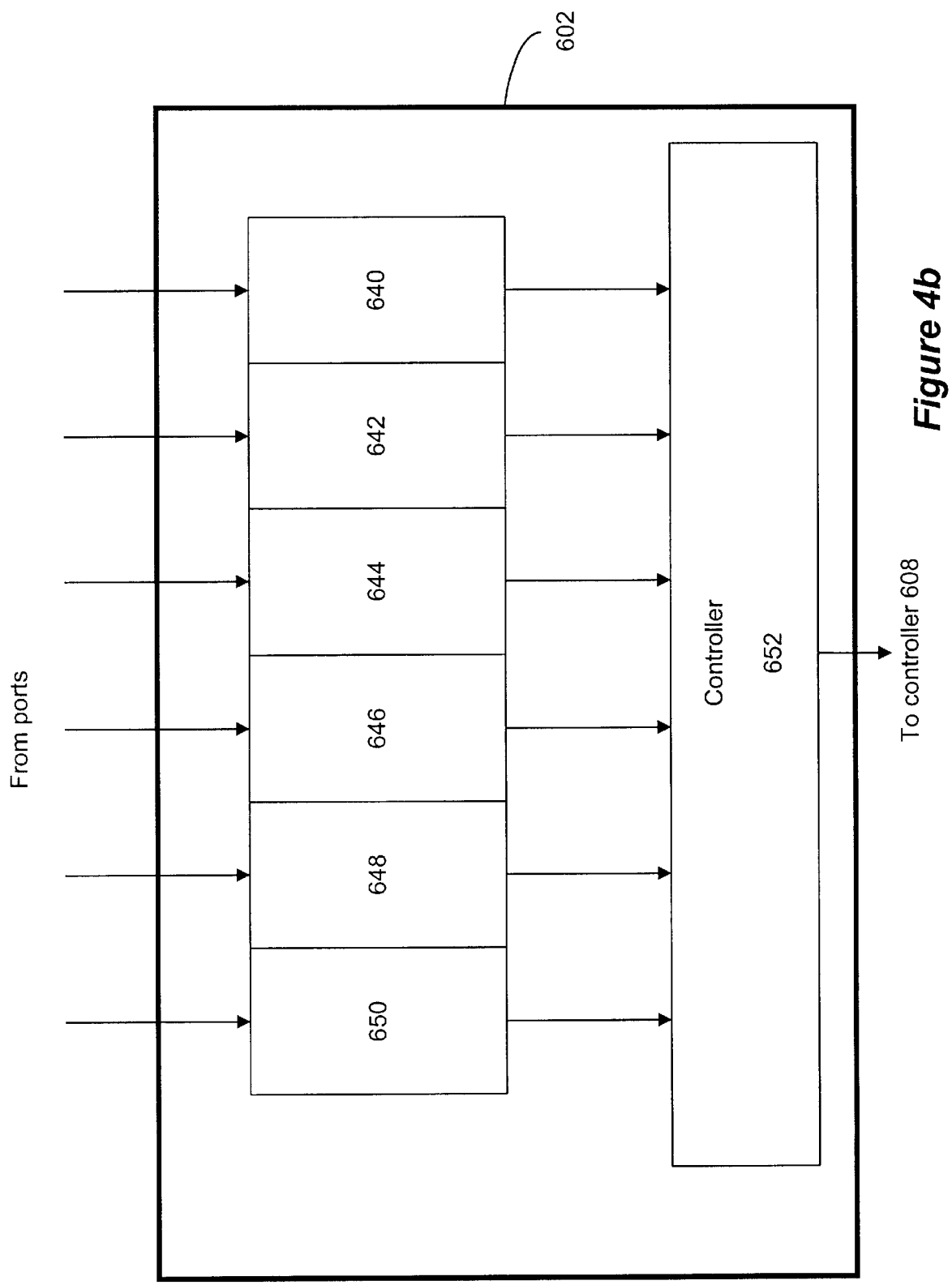
FIG. 4b is a block diagram illustrating a memory device within the arbiter of the present invention.

Referring now to FIG. 4b, there is shown memory device 602 in greater detail. Memory devices 604 and 606 are identical. Memory device 602 includes memory or storage devices 640–650, which may be conventional FIFOs. The number of storage devices 640–650 corresponds to the number of ports on a routing device. Each data synchronizer in each input port is coupled to a separate storage device 640–650.

Storage devices 640–650 receive the valid and address identification bits sent by the data synchronizers. When a high valid bit is received at one or more of the storage devices 640–650, the inputs of all the storage devices 640–650 are clocked into the storage devices 640–650. Because the inputs of all the storage devices are clocked in at the same time, the memory devices 602, 604, 606 can have multiple inputs. Thus arbiter 614 can receive different request for the same priority simultaneously. The storage devices 640–650 will output bits in the order in which they were received, and bits clocked in together will be outputted together. If two or more high valid bits were received at the same time, a controller 652 will output the high valid bit received at the lowest input port first. It should be understood that controller 652 can decide which valid bit to output on the basis of any ordering of the input ports. The operations of controller 652 are implemented with conventional logic circuitry.

The arbiter 614 only grants access to the output of port 6 if there is adequate space in the receiving input buffer 712 in port 7. Flow control receiver unit 616 receives buffer status messages indicating the space capacity of input buffer 712, and it informs arbiter 614 of what priority requests, if any, can be granted. If there is at least three spaces available in input buffer 712, flow control receiver 616 asserts a signal indicating that a request of any priority may be granted. If there are only two spaces available in input buffer 712, the flow control receiver 616 generates a signal indicating that only a medium or high priority requests may be granted. If there is only one space available, flow control receiver 616 generates a signal indicating that only a high priority request may be granted. This method guarantees that input buffer 712 has enough space to receive the data packet. Moreover, if the data packet has a medium or low priority, this method ensures that space is reserved in the input buffer 712 for higher priority traffic. If space is not reserved for higher priority traffic, higher priority requests may be stalled by lower priority requests.

Flow control transmitter 718 monitors the space capacity of input buffer 712. It generates the buffer status messages received at flow control receiver 616. The buffer status messages travel from flow control transmitter 718 to conventional multiplexer 722, which outputs the buffer status messages when arbiter 714 asserts a port-idle signal. Arbiter 714 asserts the port-idle signal either in response to not granting any requests to access the output of port 7 or in response to receiving a force signal from flow control transmitter 718. Flow control transmitter 718 generates the force signal when buffer status messages must be sent to prevent unnecessary blocking of data packets. The buffer status messages outputted from multiplexer 722 are received at data synchronizer 610, which synchronizes the messages and forwards them to flow control receiver 616.

When the arbiter 614 grants the data packet access to the output of port 6, it sends a grant signal to input buffer 112, crossbar switch 12, and modification unit 620. In response to receiving the grant signal, input buffer 112 transfers the data packet to the crossbar switch 12. The grant signal remains asserted during the entire transfer of the data packet to crossbar switch 12.

The grant signal enables crossbar switch 12 to send the data packet to modification unit 620, which modifies the header of the data packet in response to receiving the grant signal. Using conventional methods, the header is modified to indicate the address of the location in which the data packet will be stored in input buffer 712. The modified data packet is then sent to multiplexer 622, which outputs the data packet if arbiter 614 has not asserted the port_idle signal.

On the first cycle of a grant, flow control receiver unit 616 receives a new_gant signal from arbiter 614. The new_ grant signal informs flow control receiver 616 that there is one less space available in input buffer 712. If necessary, flow control receiver 616 then adjusts its indication of what priority a next packet must be in order for the packet to be sent to input buffer 712.

Figure 5:
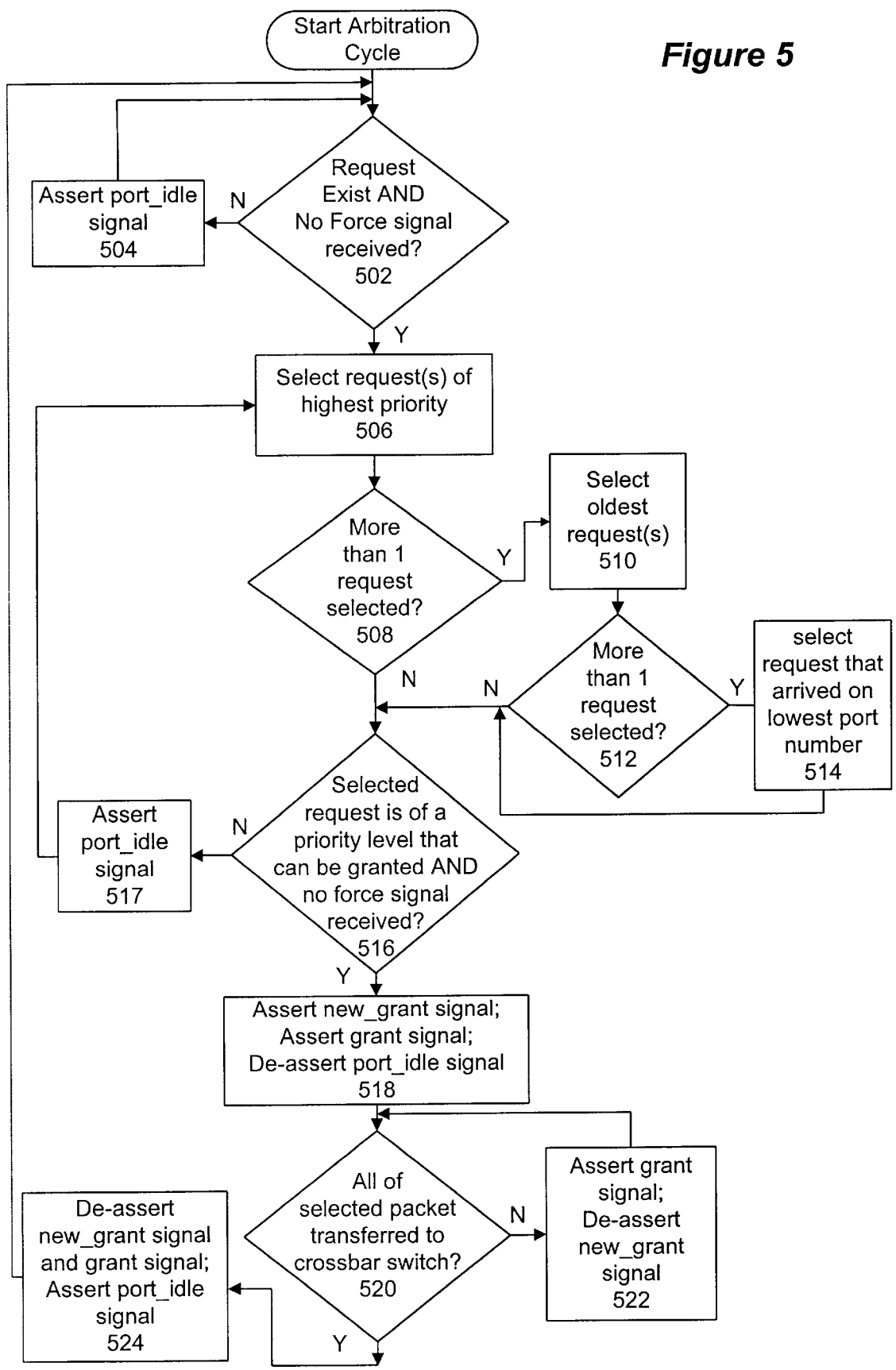
FIG. 5 is a flow chart illustrating the arbitration method of the present invention.

The flow chart in FIG. 5 illustrates the arbitration method of the present invention. To start an arbitration cycle, arbiter 614 determines 502 whether the force signal from flow control transmitter 618 is asserted or whether any requests to access the output of port 6 exist. If no requests exist or the force signal is asserted, arbiter 614 asserts 504 a port_idle signal and returns to step 502.

If a request exists, arbiter 614 selects 506 the request or the requests having the highest priority in the current arbitration cycle. There are three priority levels, but other numbers of priority levels can exist. The three priority levels are high, medium and low, where high priority requests are granted before medium and low priority requests and where medium priority requests are granted before low priority requests.

Arbiter 614 then determines 508 whether more than one request of the highest priority in the current arbitration cycle exists. In response to there being more than one such request, the arbiter 614 selects 510 the first such request received. This ensures that packets having the same priority and contending for the same output will be transmitted in the order in which they were received. Otherwise, if packets of the same priority arrived out of order, they would have to be reordered at a destination node or routing device, which would increase source-to-destination transmission time and inhibit an economical all-hardware implementation of the destination node. Selecting the first packet received within a priority level also prevents packets from being unduly delayed because of other packets of the same priority. Note that, if memory devices 602, 604 and 606 are comprised of FIFOs, as discussed with respect to FIG. 4b, the controller 608 may not have to perform steps 508 and 510 because FIFOs will automatically output the first request received.

If two or more requests were received at the same time and these are the first requests received, arbiter 614 selects 512, 514 the request corresponding to the packet that arrived on the lowest number input port. It should be understood that arbiter 614 can select the request corresponding to the packet on the basis of any order of the ports.

Once one request has been selected, arbiter 614 ascertains 516 whether the force signal is asserted and whether the request is of a priority that can be granted. As discussed above, flow control receiver 616 indicates to arbiter 614 what priority a request must be in order to gain access to the output. For a high priority request to be granted, there must be at least one space available in the receiving input buffer. For a medium priority request to be granted, there must be at least two spaces empty in the receiving input buffer. This ensures that there will still be enough space in the input buffer for high priority traffic. For a low priority request to be granted, there must be at least three spaces available in the receiving input buffer, thereby ensuring that there will still be enough space in the input buffers for high and medium priority traffic. In a similar manner, to grant requests having other levels of priority, the number of spaces available in the receiving input buffer must be at least one plus the number of priorities higher than the priority of the request. If the selected request cannot be granted or the force signal is asserted, arbiter 614 asserts 517 the port_idle signal and returns to step 506. Otherwise, arbiter 614 proceed to step 518.

In step 518, arbiter 614 de-asserts the port_idle signal and asserts the grant signal and the new_grant signal. On the next clock cycle, arbiter 614 ascertains 520 whether the data packet associated with the selected request has been completely transferred to the crossbar switch 12. If not, arbiter 614 asserts 522 the grant signal, but not the new_grant signal, until the transmission is complete. Otherwise, arbiter 614 asserts the port_idle signal and ensures 524 that neither the grant signal nor the new_grant signal is asserted. This completes an arbitration cycle, and arbiter 614 returns to step 502.

The chart in FIG. 6 illustrates examples of the arbitration method of the present invention. At time $t_1$, two medium priority requests and one low priority request exist. Since medium priority is the highest priority at time t1, the arbiter selects the medium priority request first received. This request is granted because sufficient space exists in the receiving input buffer for a medium priority request.

At time $t_2$, a high priority request, a medium priority request and a low priority request are pending. The arbiter selects the high priority request, but, since the receiving input buffer has no space, the request cannot be granted and the port_idle signal is asserted. At time $t_3$, space is available in the receiving input buffer, and the arbiter grants the high priority request and de-asserts the port_idle signal. At time $t_4$ the arbiter receives the force signal. Consequently, no requests are granted and the port_idle signal is asserted.

Section II

In one embodiment, flow control receiver 616 and flow control transmitter 718 can be the flow control receiver and the flow control transmitter described below. The description below is substantially similar to sections of U.S. patent application, Ser. No. 08/603,913, attorney docket number 2274, entitled "A FLOW CONTROL PROTOCOL SYSTEM AND METHOD" filed on Feb. 22, 1966, by Thomas M. Wicki, Patrick J. Helland, Jeffrey D. Larson, Albert Mu, and Raghu Sastry.

Figure 7:
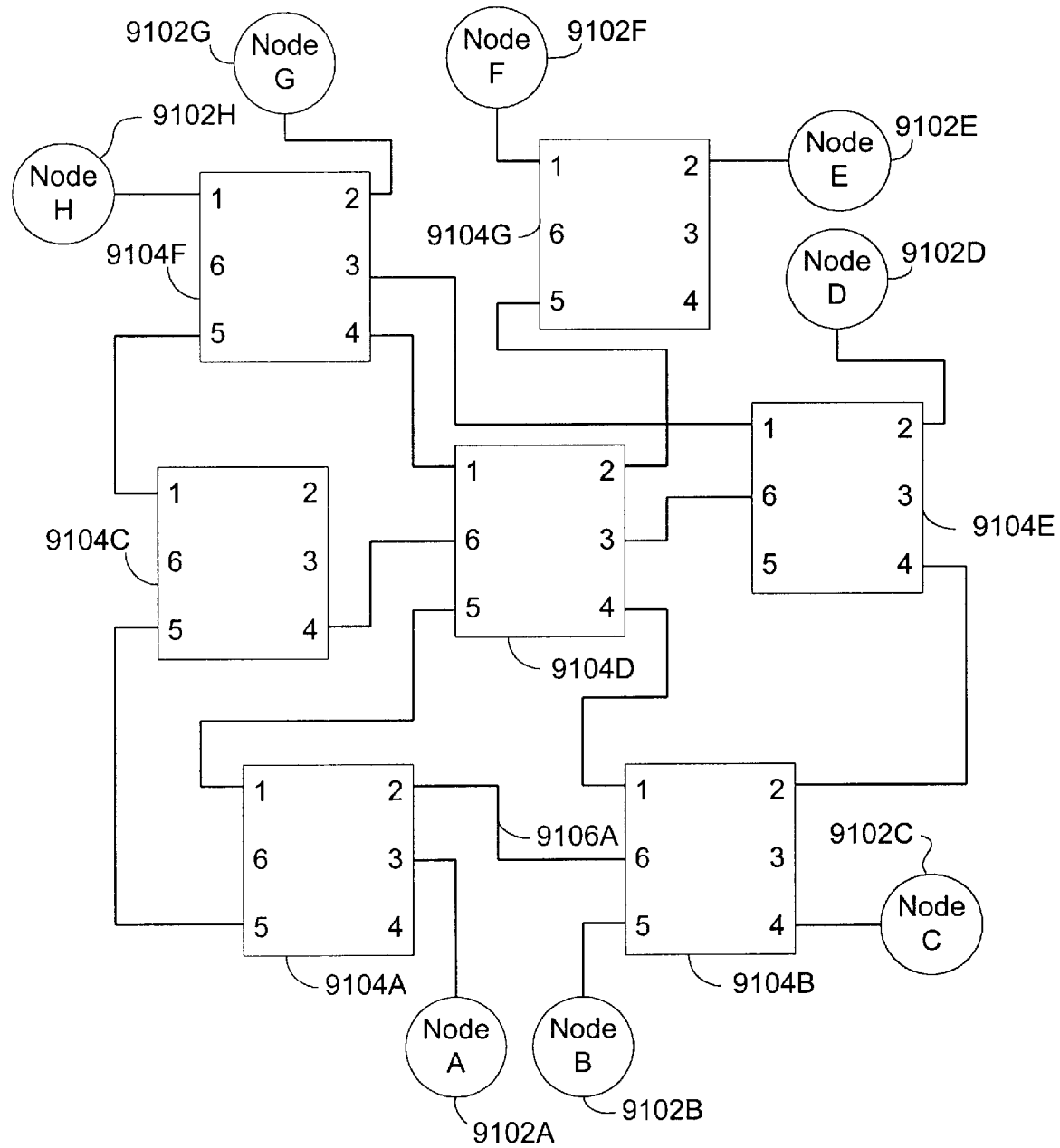
FIG. 7 is an illustration of a network including nodes, routers, and links according to an embodiment of the present invention.

FIG. 7 is an illustration of a network including nodes, routers (routing devices), and links according to an aspect of the present invention. The network illustrated in FIG. 7 includes eight nodes 9102, i.e., Nodes A–H 9102A–H, and seven routers 9104A–G. In an aspect of the present invention the network is a distributed memory system. That is, the system has an architecture that is physically distributed but its memories (storage devices) are logically shared. For example, a node, e.g., 9102D, can request access to a memory location that Node D 9102D believes is local but is actually physically located at a different location and is coupled to a different node, e.g., Node A 9102A. The requesting node (Node D 9102D) identifies the location of the memory and the network quickly retrieves the data. In a distributed memory network an important performance parameter is the latency of the network. The latency of the network is the time required to provide a requesting node with the requested data as measured from the time at which the memory request is transmitted.

If Node D 9102D requests data that is stored in Node A 9102A, Node D 9102D transmits a data request across the network. The data request will travel from, for example, Node D 9102D to a third router 9104E, to a second router 9104B, to a first router 9104A, and then to Node A 9102A. The data will be retrieved from the storage device coupled to Node A 9102A and sent across the network to Node D 9102D. The data is sent in packets across the network. The node, e.g., Node A 9102A, determines the routing path through the network and stores this routing information in a frame header of each packet. For example, the data being sent from Node A 9102A to Node D 9102D can have routing information directing each packet to travel from Node A 9102A to the first router 9104A, then from the first router 9104A to the second router 9104B, then from the second router 9104B the third router 9104E, and then from the third router 9104E to Node D 9102D. Since the latency of the network is the duration between the requesting node sending a data request and the requesting node receiving the data, reducing the delay introduced by each of the routers 9104 reduces the network latency. As described above, each router 9104 includes buffers for temporarily storing the data that is received. In an embodiment, there are six buffers per router port and there are six ports on a router. The size of each buffer is equal to the maximum packet length, e.g., 1292 bits. However, as described above, when designing a router 9104, cost is an important consideration. Increasing the number of buffers in each router is expensive and in some situations is not feasible because of size constraints on an integrated circuit where the buffers reside.

The routers are connected to each other by duplex signal lines 9106. Each duplex signal line 9106A is capable of simultaneous transporting data in both directions, e.g., both from the second port of the first router 9104A and to the second port of the first router 9104A. The duplex signal line 9106A is described in greater detail below with reference to FIG. 8.

Figure 8:
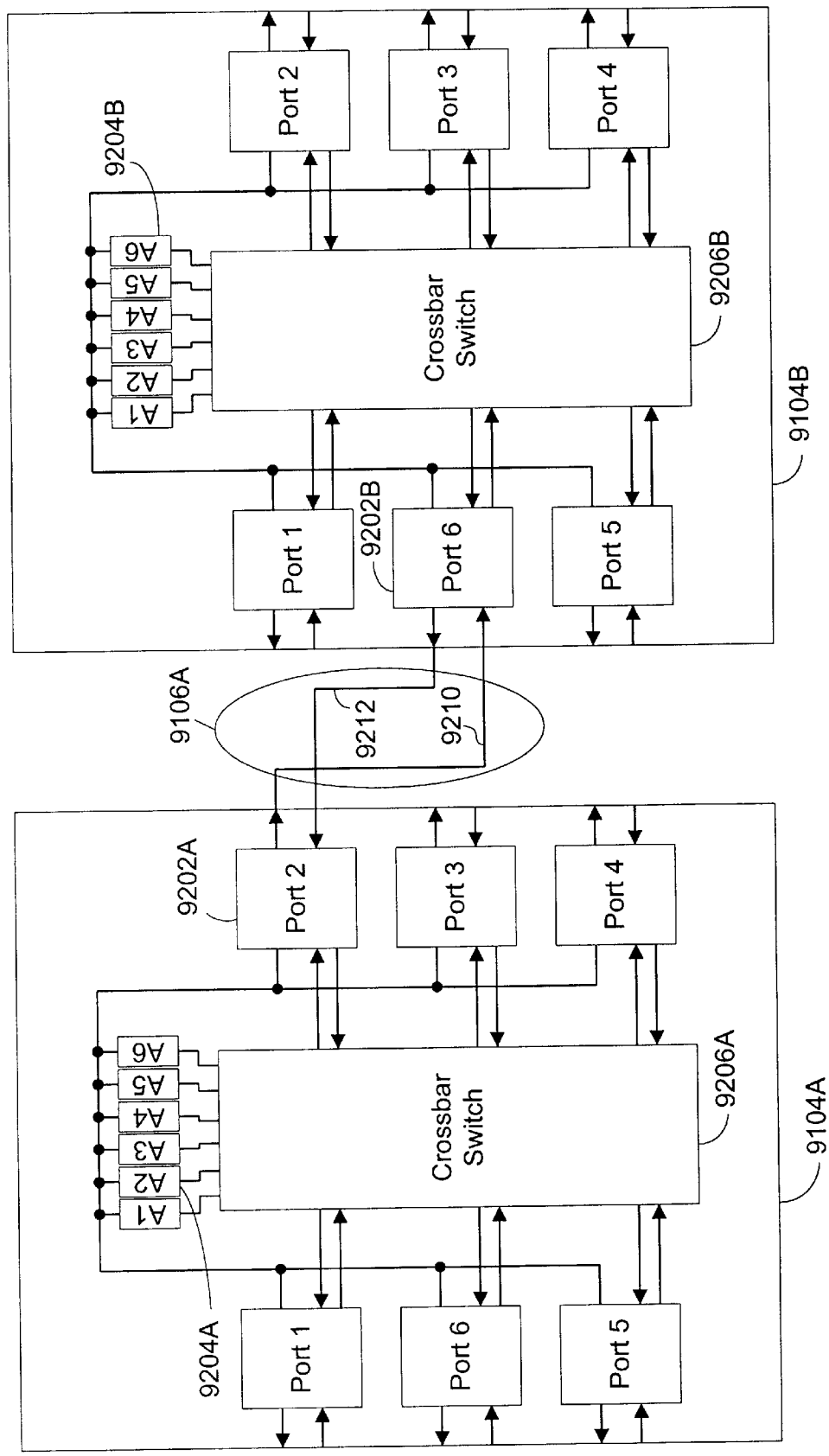
FIG. 8 is more detailed illustration of two routers in the network illustrated in FIG. 7, according to an embodiment of the present invention.

FIG. 8 is more detailed illustration of two routers 9104 in the network illustrated in FIG. 7, according to an aspect of the present invention. The duplex signal line 9106A is represented by two signal lines 9210, 9212. Each signal line is uni-directional. A first signal line 9210 transports information from port 2 9202A of the first router 9104A to port 6 9202B of the second router 9104B. A second signal line 9212 transports information from port 6 9202B of the second router 9104B to port 2 9202A of the first router 9104A. In an embodiment, each illustrated signal line 9210, 9212 includes 43 signal lines that transport data between ports in parallel. Each router 9104 includes six ports 9202 that are each coupled to a crossbar switch 9206. In addition, each port is connected to six arbiters 9204, e.g., A1–A6, and each arbiter 9204 is associated with an output portion of one of the ports. For example, arbiter 2 9204A on the first router 9104A is coupled to an output portion of port 2 9202A. The output portion of port 2 9202A is coupled to the signal line 9210. As shown in FIG. 8, each port, e.g., port 2 9202A of the first router 9104A and port 6 9202B of the second router 9104B, is coupled to only one other port in a different router. For example, port 2 9202A of the first router 9104A is coupled to port 6 9202B of the second router 9104B, i.e., port 2 9202A of the first router 9104A only receives data from and only transmits data to port 6 9202B of the second router 9104B, and port 6 9202B of the second router 9104B only receives data from and transmits data to port 2 9202A of the first router 9104A. The operation of the arbiters 9204, the crossbar switches 9206 and the ports 9202 are described in greater detail below with reference to FIGS. 3–9.

Figure 9:
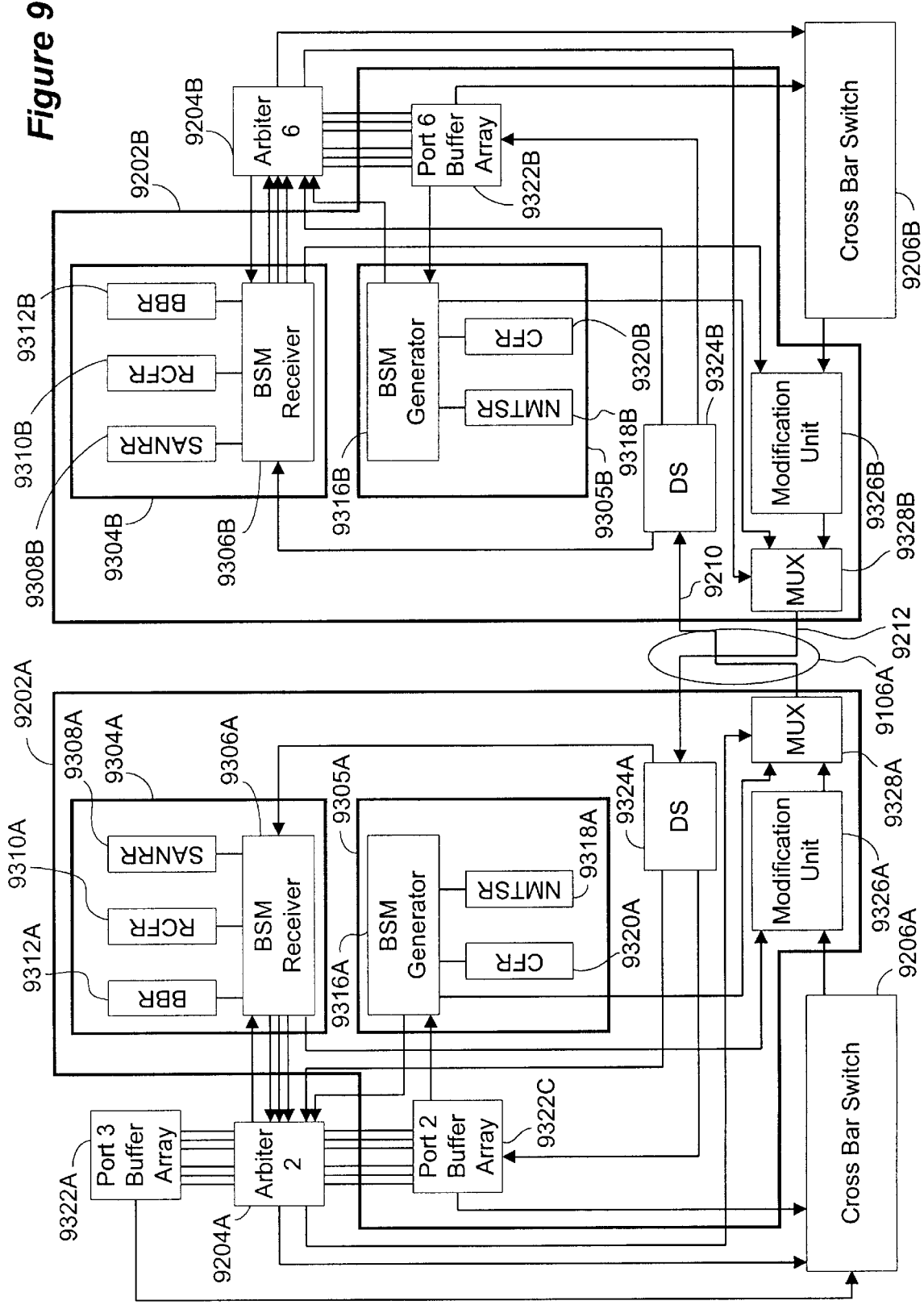
FIG. 9 is a more detailed illustration of the two routers illustrated in FIG. 8, according to an embodiment of the present invention.

FIG. 9 is a more detailed illustration of the first router 9104A and the second router 9104B illustrated in FIGS. 1 and 2, according to an aspect of the present invention. Each port 9202 in each router 9104 includes a flow control receiver 9304, a buffer array 9322, a modification unit 9326, a multiplexor (MUX) 9328, a data synchronizer 9324, and a flow control transmitter 9305. Each flow control receiver 9304 includes a buffer status message (BSM) receiver 9306 that is connected to a sent-and-not-received register (SANRR) 9308, a received-currently-full register (RCFR) 9310, and a buffer-busy register (BBR) 9312. Each flow control transmitter 9305 includes a BSM generator 9316 that is connected to a next-message-to-send register (NMTSR) 9318 and a currently-full register (CFR) 9320. Although described with reference to routers 9104, each node 9102 also includes the registers in the flow control receiver 9304A and the flow control transmitter 9305B. The operation of these port components is now described with reference to the data transfer example set forth above.

If Node D 9102D requests data that is stored in a memory device that is controlled by Node A 9102A, Node D 9102D transmits a request to Node A 9102A. Node A 9102A retrieves the data, determines the route the data packets will take through the network, and stores this routing information in the header of each packet, as described above. The first router 9104A receives data in the form of packets from Node A 9102A. Node A 9102A is coupled to port 3 of the first router 9104A. Accordingly, each packet is sent to a buffer in the port 3 buffer array 9322A. The routing information in the frame header identifies the next router 9104 to which the data is to traverse through. In the present example, the next router is the second router 9104B. Port 2 9202A of the first router 9104A is coupled to port 6 9202B of the second router 9104B. Accordingly, the routing information in the frame header identifies port 2 9202A as the output port for the first router 9104A. This output port information is received by the arbiter 9204 associated with the output port. In the present example, arbiter 2 9204A is associated with port 2 9202A of the first router 9104A. Arbiter 2 9204A receives signals from the flow control receiver 9304A indicating whether a data transfer to the receiving port can take place. In the present example, the receiving port is port 6 9202B of the second router 9104B. Arbiter 2 9204A then transmits a signal to a first buffer in the port 3 buffer array 9322A instructing the port 3 buffer array 9322A to send the data in the first buffer to the crossbar matrix 9206. Arbiter 2 9204A also sends a signal to the crossbar matrix 2906 causing the crossbar matrix 9206 to couple the first buffer in the port 3 buffer array 9322A to port 2 9202A of the first router 9104A. Each of the arbiters 9204 can be arbiter 614 described in section I. The operation of each crossbar matrix 9206 is described in greater detail in the co-pending patent application entitled "CROSSBAR SWITCH AND METHOD WITH REDUCED VOLTAGE SWING AND NO INTERNAL BLOCKING DATA PATH" filed on Feb. 22, 1966, by Albert Mu and Jeffrey D. Larson, that was identified and incorporated by reference in its entirety above.

Before sending the signal to arbiter 2 9204A that indicates whether a data transfer to the receiving port (port 6 9202B of the second router 9104B) can take place, the flow control receiver 9304A transmits a signal to the modification unit 9326A identifying the address of an empty buffer (the receiving buffer) in the port 6 buffer array 9322B. The BBR 9312A in the flow control receiver 9304A includes one bit for each buffer in the port 6 buffer array 9322B of the second router 9104B. The value of each bit in the BBR 9312A indicates whether the first router 9104A has determined that the associated buffer is empty in the port 6 buffer array 9322B of the second router 9104B. The technique for setting and resetting the bits in the BBR 9312A is described below with reference to FIGS. 4–9. The modification unit 9326A in the first router 9104A receives the address of an empty buffer in the port 6 buffer array 9322B in the second router 9104B. This empty buffer is the receiving buffer.

When arbiter 2 9204A instructs the crossbar switch 9206A to connect the first buffer in the port 3 buffer array 9322A to the modification unit 9326, arbiter 2 9204A also sends a signal to the flow control receiver 9304A informing the flow control receiver 9304A that a packet has been transmitted. The BSM receiver 9306A in the flow control receiver 9304A modifies the value of the bit in the SANRR 9308A that is associated with the receiving buffer in the port 6 buffer array 9322B to indicate that a packet has been sent to the receiving buffer and that the BSM receiver 9306A has not received a signal acknowledging the receipt of the packet. As described below, the value of the BBR 9312 is equal to the logical OR of the SANRR 9308A and the RCFR 9310A. Since the value of the bit associated with the receiving buffer in the port 6 buffer array 9322B is set equal to a logical one, the associated bit in the BBR 9312A is also set equal to a logical one. When this bit is equal to a logical one, the buffer address signal sent from the flow control receiver 9304A to the modification unit 9326A in the first router 9104A will not identify the receiving buffer until this bit in the BBR 9312A is reset, i.e., the receiving buffer is identified as "busy" until the BBR 9312A is reset. If all of the buffers in the port 6 buffer array 9322B are not empty as determined by the information in the most recent BSM or as determined by the flow control receiver 9304A by setting the SANRR 9308A and BBR 9312A when the first router 9104A transmits a packet to the second router, then all of the bits in the BBR 9312A will be set equal to a logical one. In this situation, the BSM receiver 9306A notifies arbiter 2 9204A, and arbiter 2 9204A will not permit the transmission of any additional packets to port 6 9202B until at least one bit in the BBR 9312A is reset. The above description describes the environment where only a single transport priority level exists for all packets. As described below, the present invention also supports packets having multiple transport priority levels.

The modification unit 9326A receives the packet from the port 3 buffer array 9322A via the crossbar switch 9206A, and receives the receiving buffer address from the flow control receiver 9304A. The modification unit 9326A modifies the frame header by removing the routing information that identifies port 2 9202A of the second router 9104B and shifts the remaining routing information in the frame header, for example. The modification unit 9326A also adds the receiving buffer address to the frame header. The modification unit 9326A transmits the packet to the MUX 9328A that transmits the packet to the second router 9104B via signal line 9210 of the duplex signal lines 9106A.

A data synchronizer 9324B in the second router 9104B receives the data from port 2 9202A of the first router 9104A. Each router 9104 includes a clock (not shown). One function of the data synchronizer 9324B is to synchronize the received data with the internal clock of the second router 9104B. Another function of the data synchronizer 9324B is to distinguish between data packets and buffer status messages that are received from the first router 9104A using a data/status control signal. After determining that the received packet is a data packet, the data synchronizer 9324B transmits the data to the receiving buffer in the port 6 buffer array 9322B. After receiving the frame header, the second router can begin transmitting the data to the third router 9104E using the technique described above. However, if all of the buffers in the port 4 buffer array in the third router 9104E are not empty, the second router 9104B will continue storing the data received from the first router 9104A in the port 6 buffer array 9322B.

When data is received by the receiving buffer in the port 6 buffer array 9322B, the BSM generator 9316B in the BSM transmitter 9305B is notified. The BSM generator 9316B sets a bit in the NMTSR 9318B, that is associated with the receiving buffer, equal to a logical one to indicate that a portion of the packet has been received by the receiving buffer. In addition, the BSM generator 9316B sets an associated bit in the CFR 9320B equal to a logical one to indicate that the receiving buffer is not empty. The BSM transmitter 9305B generates and transmits a BSM. The contents of the BSM are described below with reference to FIGS. 4–9. The BSM includes an acknowledgment that the packet sent by the first router 9104A was received, and also includes an indication of the status of the buffers in the port 6 buffer array, e.g., whether each buffer is empty. The BSM generator 9316B transmits the data to an input port of the MUX 9328B in the second router 9104B. In addition, the BSM generator 9316B can transmit a signal to arbiter 6 9204B requesting that a BSM be sent to the first router 9104A. Arbiter 6 9204 generates a signal that controls the MUX 9328B. When this signal is sent by arbiter 6 9204B, the BSM is transmitted to port 2 9202A of the first router 9104A via signal line 9212.

The data synchronizer 9324A in port 2 9202A receives the BSM. The data synchronizer 9324A determines that the received data is a BSM and sends the data to the BSM receiver 9306A in the flow control receiver 9304A. The flow control receiver 9304A updates the SANRR 9308A, RCFR 9310A, and BBR 9312A based upon the received BSM. As described above, the bit values in these registers is received by the BSM receiver 9306A. The BSM receiver 9306A determines if any more packets can be sent to port 6 9202B in the second router 9104B. The operation of the flow control receiver 9304A and the flow control transmitter 9305B are described in greater detail below with reference to FIGS. 4–9.

Figure 10:
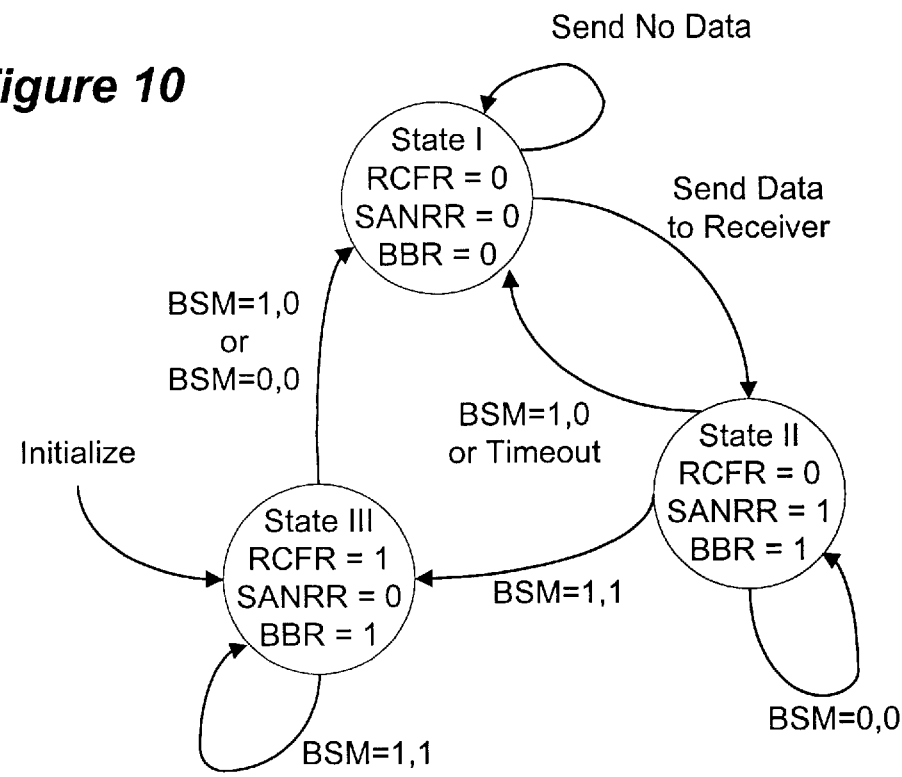
FIG. 10 is a state diagram illustrating the states of buffers in a data transmitting router in response to a buffer status message that includes values representing two registers in a data receiving router, according to an embodiment of the present invention.

FIG. 10 is a state diagram illustrating the states of buffers in the flow control receiver 9304A in the first router 9104A in response to a BSM that includes values representing both the NMTSR 9318B and the CFR 9320B in the flow control transmitter 9305B in the second router 9104B, according to an embodiment of the present invention. A benefit of the flow control protocol of present invention is that it is robust. That is, the flow control protocol can recover from transmission errors, e.g., lost BSMs or lost data packets. When packets are transmitted from the first router 9104A to the second router 9104B, the flow control protocol of the present invention utilizes five registers.

Figure 11:
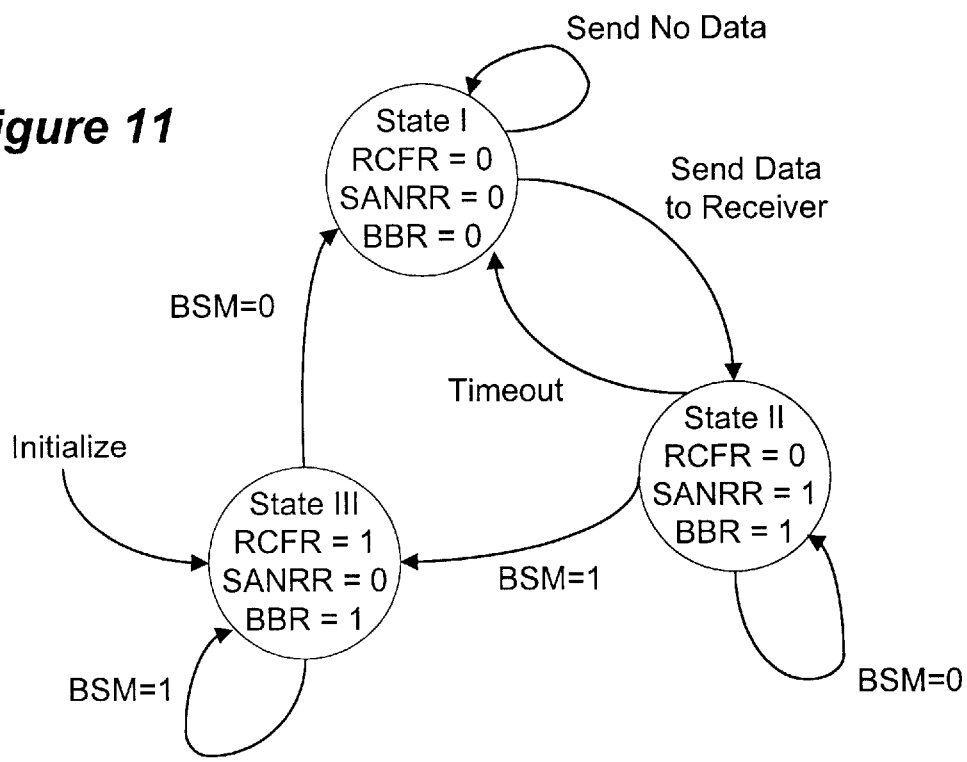
FIG. 11 is a state diagram illustrating the states of buffers in a data transmitting router in response to a buffer status message that includes values representing one register in a data receiving router, according to an embodiment of the present invention.

These registers are the SANRR 9308A, RCFR 9310A, and the BBR 9312A in the flow control receiver 9304A in the first router 9104A, and the NMTSR 9318B and CFR 9320B in the flow control transmitter 9305B in the second router 9104B. The following description of the flow control protocol will reference these five registers. As described above, each of these five registers includes a bit associated with each buffer in the port 6 buffer array 9322B. In an embodiment, the port 6 buffer array 9322B includes six buffers. FIG. 10 and FIG. 11 represent the state diagram for one bit in each of these five registers. Accordingly, the flow control protocol for a single buffer is now set forth.

When the network is initialized, the registers in the flow control receiver 9304A are initialized to the values associated with state III That is, RCFR=1, SANRR=0, and BBR=1. As described above, the BSM receiver 9306A sets the value of the BBR 9312A equal to the logical OR of the RCFR 9310A and the SANRR 9308A. The flow control receiver registers, i.e., SANRR 9308A, RCFR 9310A, and BBR 9312A, are set to the values shown in state III because it is the most conservative flow control presumption. That is, when the flow control receiver registers are in state In, the flow control receiver 9304A will prevent any data from being sent to port 6 9202B of the second router 9104A because when in state III, the BBR 9312A is set equal to a logical one, indicating that the receiving buffer is not empty. As discussed below, if the receiving buffer is empty, the flow control protocol modifies the state of the flow control receiver registers to indicate the proper state. As described above, the BSM includes the bit values of the NMTSR 9318B and the CFR 9320B. For this example, a BSM=1,0 indicates that the bit in the NMTSR 9318B that is associated with the receiving buffer has a value equal to a logical one, and that a bit in the CFR 9320B that is associated with the receiving buffer has a value equal to a logical zero. After transitioning from state II to state III, there are only two permissible BSM values, i.e., BSM=1,1, and BSM=1,0. The reason for this is that the NMTSR 9318B is equal to either: (1) the value of the CFR 9320B transmitted in the previous BSM; or (2) a logical one for at least one BSM when a packet is received by the receiving buffer regardless of the value of the associated bit in the CFR 9210B in the previous BSM. When in state III, the value of the CFR 9320B in the last BSM is equal to a logical one, since the RCFR 9310A stores this value. Accordingly, the value for the NMTSR 9318B in the next BSM must be equal to a logical one based upon (1) and (2) above. However, if the registers are in state III as a result of an initialization procedure, a BSM=0,0 is valid and results in the registers in the flow control receiver 9304A transitioning from state III to state I.

A BSM=1,1 indicates that the received buffer is not empty. Accordingly, if a BSM=1,1 is received by the flow control receiver 9304A, the state of the registers in the flow control receiver 9304A remain the same. A BSM=1,0 indicates that the packet has been received by the receiving buffer in the port 6 buffer array 9322B, and transmitted to the third router 9104E. Therefore, the receiving buffer is now empty. If a BSM=1,0 is received, the registers in the flow control receiver 9304A transition from state III to state I.

In state I, the SANRR 9308A, RCFR 9310A, and the BBR 9312A are all equal to a logical zero. Since the BBR 9312A is equal to a logical zero, the flow control receiver 9304A notifies arbiter 2 9204A that the receiving buffer is empty. Subject to priority restrictions, discussed below, if a packet is available in port 3 9202A to be transmitted to port 6 9202B of the second router 9104B, arbiter 2 9204A instructs the crossbar matrix 9206A to connect the transmitting buffer in the port 3 buffer array 9322A to the modification unit 9326A of port 2 9202A. As described above, arbiter 2 9204A also transmits a signal to the flow control receiver 9304A informing the flow control receiver 9304A that the data has been sent. At this time, the BSM receiver 9306A sets the SANRR 9308A equal to a logical one, and therefore sets the BBR 9312B equal to a logical one. The RCFR 9310A is not modified. Therefore, if data is transmitted to the second router 9104B, the registers in the flow control receiver 9304A transition to state II. If no data is sent while in state I, the registers in the flow control receiver 9304A remain in state I.

In state II, the SANRR 9308A and the BBR 9312A are equal to a logical one, and the RCFR 9310A is equal to a logical zero. In this state, the registers in the flow control receiver 9304A indicate that a packet has been sent to the receiving buffer in the port 6 buffer array 9322B but the flow control receiver 9304A has not received an acknowledgment that the receiving buffer has received the packet, via a BSM. In addition, the RCFR 9310A is equal to a logical zero indicating that based upon the most recent BSM, the receiving buffer is empty. When in state II, the flow control receiver 9304A will not permit another packet to be sent to the receiving buffer. If a BSM=0,0 is received, the registers in the flow control receiver 9304A remain in state II because the BSM indicates that no data was received in the receiving buffer since the previous BSM was transmitted. If a BSM=1,1 is received, the registers in the flow control receiver 9304A transition to state III. A BSM=1,1 indicates that some packet data has been received by the receiving register and that the receiving register is not empty. Since some packet data has been received, the SANRR 9308A is reset to a logical zero. Since the receiving buffer is not empty, the RCFR 9310A is set to a logical one. A discussion of state III is provided above. If a BSM=1,0 is received, the registers in the flow control receiver 9304A transition to state I. When in state II, a BSM=1,0 indicates that packet data has been received by the receiving buffer and that the packet has been transmitted to the third router 9104E. Therefore, the receiving buffer is empty. Since the packet has been received by the receiving buffer, the SANRR 9308A is reset. Since the receiving buffer is empty, the RCFR 9310A remains equal to a logical zero. As described above, when in state I the flow control receiver 9304A can instruct arbiter 2 9204A to transmit a new packet to the receiving buffer in the port 6 buffer array 9322B.

As stated above, the flow control protocol system and method of the present invention is robust. That is, the protocol can recover from transmission errors. A timeout feature of the flow control protocol enables the network to recover from BSM or packet transmission errors that could otherwise reduce the number of available buffers in the buffer arrays 9322. If the registers in the flow control receiver 9304A are in state II and the flow control transmitter 9305B in the second router 9104B generates, for example, a BSM=1,0, the registers in the flow control receiver 9304A transition to state I and the receiving buffer is available to receive additional packets, as described above. However if this BSM is never received by the flow control receiver 9304A then a problem occurs. The registers in the flow control receiver 9304A are in state II, but the flow control transmitter 9305B thinks that the registers in the flow control receiver 9304A are in state I. That is, the flow control transmitter 9305B generated and transmitted a BSM (BSM=1,0) indicating that the receiving buffer received the transmitted packet and that the receiving buffer is available to receive additional packets. Since the receiving buffer is empty and no new packets have been sent, the flow control transmitter 9305B only generates BSMs equal to BSM=0,0. Since the registers in the flow control receiver 9304A are in state II, a BSM=0,0 will not change the state of these registers. Accordingly, the flow control receiver 9304A in the first router 9104A will no longer use the receiving buffer. Similarly, if the packet that is transmitted from the first router 9104A is never received by the second router 9104B, the registers in the flow control receiver 9304A are in state II, while the flow control transmitter 9305B in the second router 9104B will only generate BSMs equal to BSM=0,0, indicating that no packets have been received.

As described above, buffers are an expensive and precious resource. The loss of a single buffer reduces the efficiency of the network. The flow control protocol of the present invention introduces a time-out mechanism to prevent the loss of buffers. The time-out mechanism determines if a predetermined minimum amount of clock cycles have occurred while the registers in the flow control receiver 9304A are in state II. If the registers are in state II for at least this minimum length of time then the flow control receiver 9304A resets its registers to state I and increments an error counter (not shown) to identify that an error has occurred. One technique for determining if the predetermined number of clock cycles has occurred is to utilize a counter for each buffer in each buffer array 9322. For example, if the counter expires for the receiving buffer, the flow control receiver 9304A transitions its registers from state II to state I. However, the number of bits required for each counter can be approximately ten or eleven bits. Requiring each router 9104 to have an eleven bit counter for each associated buffer increases the cost and decreases the potential performance of the routers 9104. In the preferred embodiment up to 36 buffers can be associated with each router 9104. The present invention solves the problem by using a single ten-bit counter for all buffers associated with a particular router, and then using only a one-bit flag for each of the associated buffers. The ten-bit counter continually counts the clock cycles, when the ten-bit counter transitions, for example, from all logical ones to all logical zeros, the onebit flag is set to a logical one for each buffer whose associated registers in the flow control receiver 9104A are in state II. If the registers in the flow control receiver 9104A change state, the one-bit flag is reset to a logical zero. However, if the state of the registers does not change by the next ten-bit counter transition to all logical zeros, a time-out will occur. As described above, when a time-out occurs the flow control receiver 9104A transitions its registers to state I.

FIG. 11 is a state diagram illustrating the states of buffers in the flow control receiver 9304A in the first router 9104A in response to a BSM that includes values representing only the NMTSR 9318B in the flow control transmitter 9305B of the second router 9104B, according to an aspect of the present invention. A discussion of how the flow control receiver 9304A interprets state I, state II, and state III, is set forth above with reference to FIG. 10. If the BSM only represents the value in the NMTSR 9318B, the flow control protocol of the present invention interprets the BSM differently than the situation where the BSM represents the values of both the NMTSR 9318B and the CFR 9320B. When the flow control receiver 9304A is initialized, the registers in the flow control receiver 9304A are set to the values indicated in state Ell. If the bit associated with the receiving register in the NMTSR 9318B is equal to a logical one when the BSM was generated, then the BSM has a value equal to a logical one, i.e., BSM=1. A BSM=1 indicates that either (1) packet data has been received by the receiving buffer since the previous BSM was sent or (2) the receiving buffer was not empty at the time the previous BSM transmission, as represented by the CFR 9320B. If a BSM=1 is received by the flow control receiver 9304A when its registers are in state III, the state of these registers do not change. A BSM=0 indicates that the receiving buffer is empty. When a BSM=0 is received by the flow control receiver 9304A, the state of its registers transition from state III to state I indicating that another packet can be sent to the receiving buffer.

The state of the registers in the flow control receivers 9104A remains in state I until a packet is transmitted to the receiving buffer in the port 6 buffer array 9322B.

When a packet is transmitted, the state of the registers in the flow control receiver 9104A transitions from state I to state II. If a BSM=0 is received while in state II, no change in state occurs. A BSM=0 indicates that no data was received by the receiving buffer since the transmission of the previous BSM. A BSM=1 is an acknowledgment that some packet data was received by the receiving buffer since the transmission of the previous BSM. Therefore, if a BSM=1 is received, the SANRR 9308A is reset, because the packet was received by the receiving buffer. However, since the SANRR 9308A must be set equal to 1 for at least one BSM after the receiving buffer receives data, no information as to whether the receiving buffer is empty at the time the BSM was sent can be discerned when a BSM=1 is received when the registers in the flow control receiver 9304A are in state II. Accordingly, the associated bit in the SANRR 9308A is reset and the associated bit in the RCFR 9310A is set to a logical one. When the BSM represents only the NMTSR 9318B, the registers in the flow control receiver 9304A do not transition from state II to state I in response to a single BSM as was possible when the BSM represented both the NMTSR 9318B and the CFR 9320B. In order to transition from state II to state I when the BSM represents only the NMTSR 9318B, the flow control receiver must receive at least two BSMs. The first BSM can transition the registers from state II to state III and the second BSM can transition the registers from state III to state I. However, the registers in the flow control receiver 9304A can transition from state II to state I if a time-out event occurs. The time-out event is described above with respect to FIG. 10. The operation of the flow control protocol system and method is described in greater detail below with respect to FIGS. 6–9.

Figure 12A:
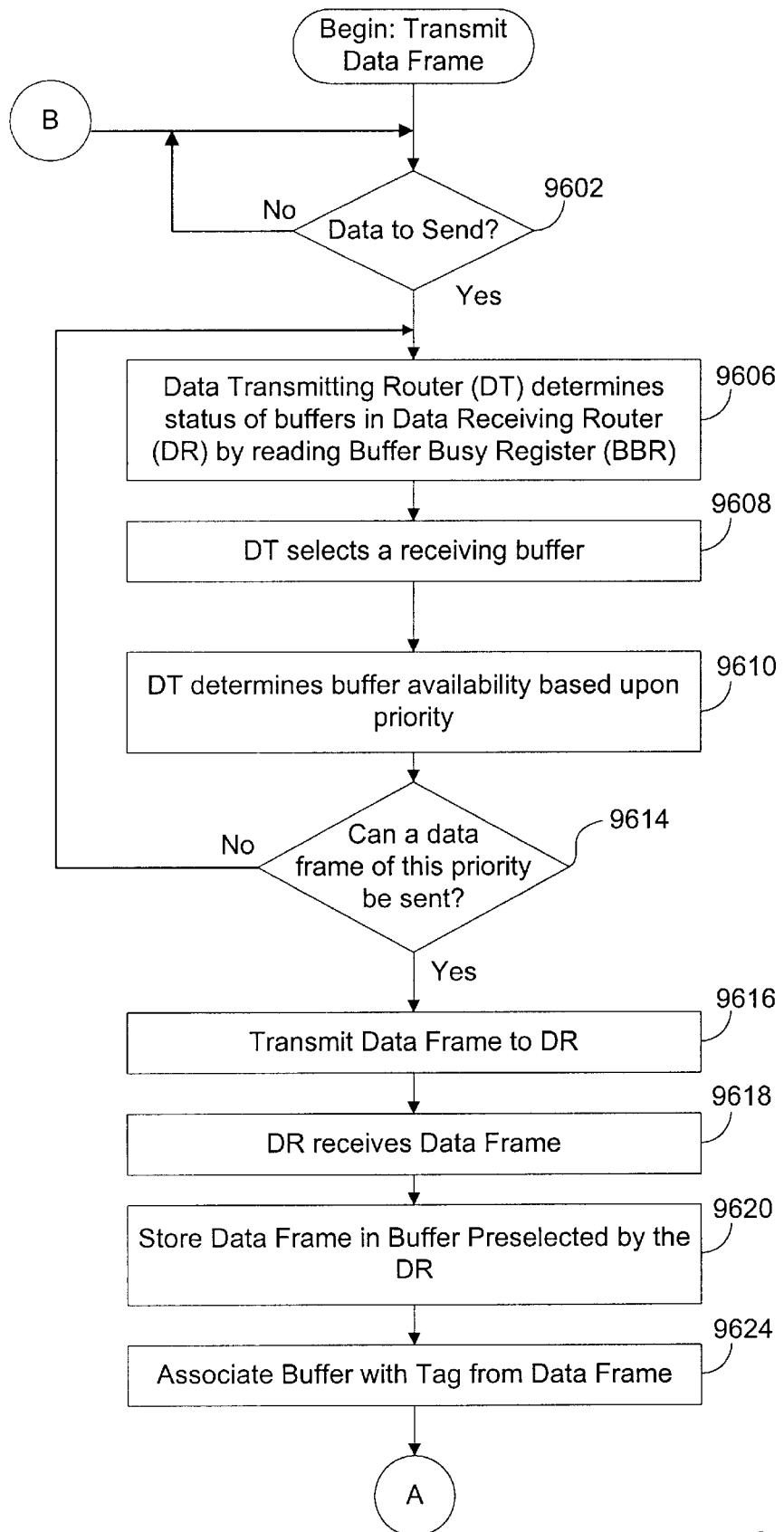
FIG. 12 is a flow diagram of the transmission protocol technique according to an embodiment of the present invention.
Figure 12B:
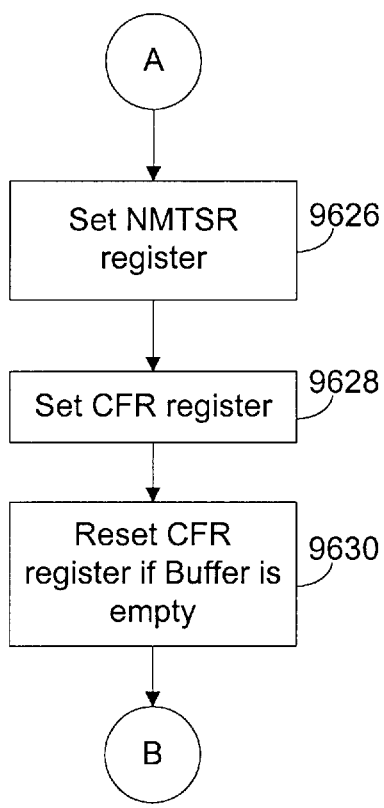

FIG. 12 is a flow diagram of the flow control protocol for transmitting a packet from the first router 9104A to the second router 9104B according to an aspect of the present invention. Arbiter 2 9204A determines 9602 if there is any data to be sent to port 6 9202B of the second router 9104B via port 2 9202A of the first router 9104A. After determining 9602 that there is data to be sent, arbiter 2 9204A checks the frame header to determine the priority of the packet. In an embodiment, each packet has one of three priorities, e.g., low, medium, or high priority. The flow control receiver 9304A in the first router 9104A determines 9606 the number of empty buffers in the port 6 buffer array 9322B. In one priority protocol example, if only one buffer is empty, the flow control receiver selects 9608 this buffer as the receiving buffer, and sends the address for the receiving buffer to the modification unit 9326A as described above. The flow control receiver 9304A determines 9610 what packet priority is required in order to transmit a packet from the first router 9104A to the second router 9104B. For example, if at least one buffer is empty in the port 6 buffer array, the flow control receiver 9304A transmits a signal to arbiter 2 on a high priority signal line indicating that a high priority packet can be transmitted to port 6 9202B. If at least two buffers are empty in the port 6 buffer array, the flow control receiver 9304A transmits a signal to arbiter 2 on the high priority signal line and a medium priority signal line indicating that a high priority packet or a medium priority packet can be transmitted to port 6 9202B. If at least three buffers are empty in the port 6 buffer array, the flow control receiver 9304A transmits a signal to arbiter 2 on the high priority signal line, the medium priority signal line, and a low priority signal line indicating that a high priority packet, a medium priority packet, or a low priority packet can be transmitted to port 6 9202B.

Arbiter 2 compares the packet priority in the frame header with the value of the signal received on the associated priority signal lines to determine 9614 if the packet has sufficient priority to be transmitted. If the priority signal line indicates that the packet cannot be transmitted, the packet will remain in the port 3 buffer array 9322A until such time as the packet can be transmitted. If the priority signal line indicates that the packet can be transmitted, the packet is transmitted 9616 to port 6 9202B of the second router 9104B in the manner described above.

The second router 9104B receives 9618 the packet. After the data synchronizer 9324B determines that it is a data packet, the data synchronizer 9324B stores 9620 the packet in the receiving buffer. The data synchronizer sends the data to the port 6 buffer array 9322B. In order to determine which buffer in the port 6 buffer array 9322B is the receiving buffer, port 6 buffer array 9322B can read the buffer address in the frame header and then multiplex the packet to the buffer whose address is in the frame header. In another technique, the port 6 buffer array 9322B selects the receiving buffer before the packet is received. When the packet is received it is immediately sent to the predetermined receiving buffer. The buffer address in the frame header is a buffer tag and is associated 9624 with the actual buffer address. When the BSM is generated, the bits in the NMTSR 9318B and the CPR 9320B will correspond to the buffer tag address of the buffer in the port 6 buffer array 9322B instead of the actual buffer address. For example, if the flow control receiver 9304A selects buffer 1 having an address equal to 001 as the receiving buffer, this address is stored in the frame header. When this packet is transmitted to the second router 9104B, the data synchronizer 9324B sends the packet to the port 6 buffer array 9322B. The port 6 buffer array 9322B may have selected buffer 3, having address 011, as the receiving buffer. The data in the packet is stored in buffer 3. However, when the BSM generator 9316B stores the NMTSR 9318B and the CFR 9320B, the status of the buffer is stored in the bit position corresponding to the tag address, i.e., 001. Accordingly, when the BSM is received by the flow control receiver 9304A in the first router 9104A, the NMTSR 9318B values and the CFR 9320B values in the BSM correspond to the tag value generated by the BSM receiver 9306A.

In an embodiment, the entire packet is not stored in the receiving buffer unless the packet cannot be forwarded to the third router 9104E. This virtual-cut-through-routing technique is achieved by having all routing information in the frame header. Therefore, once the second router 9104B receives the frame header, the output port in the second router 9104B that is connected to the third router 9104E is known, e.g., port 2, and the second router 9104B can begin transmitting the frame header to the third router 9104E before the second router 9104B receives the entire packet body.

After the receiving buffer receives a portion of the packet, the flow control transmitter 9305B in the second router 9104B sends the status of the receiving buffer to the BSM generator 9316B. If the receiving buffer was empty when the previous BSM was generated and data is received at the receiving buffer, then the associated bit in the NMTSR 9318B is set 9626 equal to a logical one. As described above, the bit in the NMTSR 9318B will remain equal to a logical one for at least one BSM in order to serve as an acknowledgment that the packet has been received by the second router 9104B. In addition, when the receiving buffer is not empty, the CFR 9320B is also set 9628 to a logical one. However, if the receiving buffer becomes empty before the BSM is generated, the CFR 9320B will be reset 9630 to a logical zero to indicate that the receiving buffer is empty. As described above, the contents of the NMTSR 9318B and, possibly, the CFR 9320B are included in the BSM. A more detailed discussion of the transmitting and receiving of BSMs is described below with reference to FIGS. 13–15.

Figure 13:
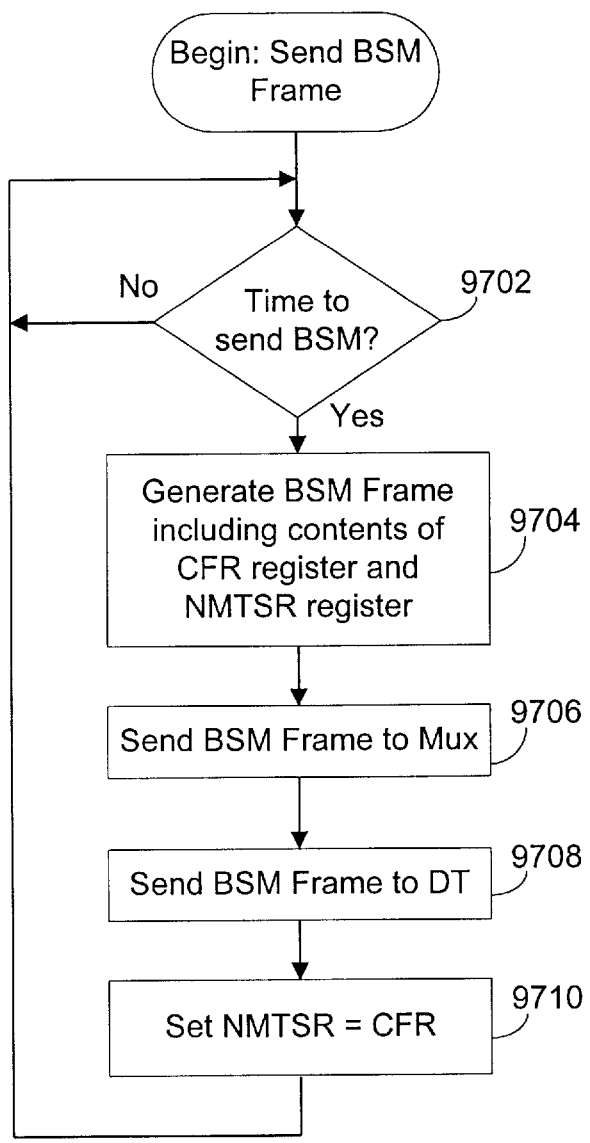
FIG. 13 is a flow diagram of a buffer status message generation and transmission technique according to an embodiment of the present invention.

FIG. 13 is a flow diagram of a buffer status message generation and transmission technique according to an aspect of the present invention. The flow control transmitter 9305B transmits a BSM whenever data packets are not being transmitted from the second router 9104B to the first router 9104A, i.e., when packets are being transmitted in the opposite direction from what is described in the above example. If the flow of data in this opposite direction is heavy, then a BSM may not be sent until after all data packets have been sent. However, there are situations when it is important for the flow control transmitter 9305B to immediately transmit a BSM to the flow control receiver 9304A. One example of this situation is when a buffer becomes available in the port 6 buffer array 9322B. It may be important that the flow control receiver 9304A receive a BSM that indicates that a buffer has become available because, for example, there may be packets stored in buffer arrays 9322 in the first router 9104A that are waiting for enough buffers to become available in the port 6 buffer array 9322B such that the packet may be transmitted. For example, if the information in the flow control receiver 9304A indicates that only two buffers are available in the port 6 buffer array 9322B, then no packets having a low priority can be sent from the first router 9104A to port 6 9202B of the second router 9104B if the priority protocol described above is utilized. When a third buffer becomes available in the port 6 buffer array 9322B, this information can be transmitted to the flow control receiver 9304A in the form of a BSM. In order to immediately transmit a BSM, the flow control transmitter sends a signal to arbiter 6 9204B in the second router 9104B that requests that a BSM be transmitted as soon as possible. Arbiter 6 9204B generates a signal that controls the MUX 9328B on the second router 9104B. In response to this signal, the MUX 9328B can multiplex the BSM on the signal line 9212 after, for example, the currently transmitting packet has been completely transmitted.

If it is time to send a BSM 9702, then the BSM generator 9316B generates 9704 a BSM. As described above, the contents of the BSM can be either the NMTSR 9318B or both the NMTSR 9318B and the CFR 9320B. The contents of the NMfSR 9318B are equal to the contents of the CFR 9320B at the time of the previous BSM with the exception that if the value of the CFR 9320B was a logical zero and some data was received in the buffer since the previous BSM was sent, then the value in the NMISR 9318B associated with the buffer is set equal to a logical one to indicate that the packet was received, as described above. The flow control transmitter 9305B transmits 9706 the BSM to the MUX 9328B. The MUX 9328B then transmits 9708 the BSM to the first router 9104A. After transmitting 9706 the BSM packet to the MUX 9328B, the flow control transmitter 9305B sets 9710 the NMTSR 9318B equal to the CFR 9320B.

Figure 14:
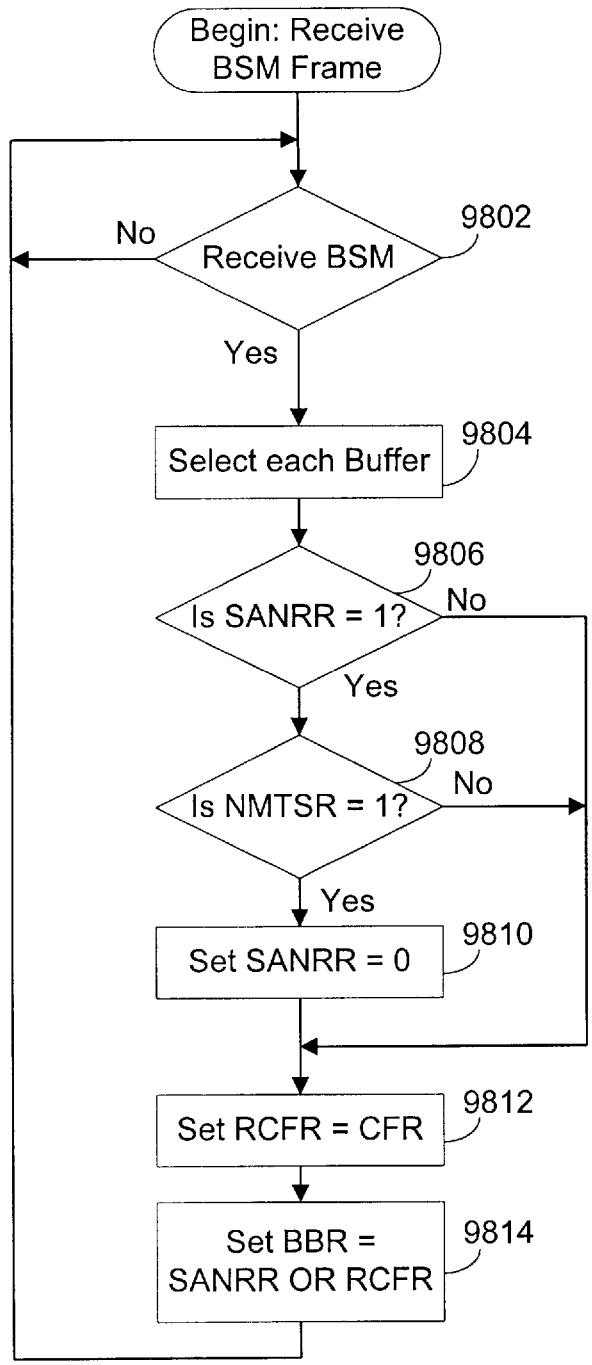
FIG. 14 is a flow diagram of a buffer status message receiving technique according to an embodiment of the present invention.

FIG. 14 is a flow diagram of a buffer status message receiving technique according to an aspect of the present invention. The data synchronizer 9324A receives the BSM, determines 9802 that the BSM is a buffer status message and not a data packet, and transmits the BSM to the flow control receiver 9304A. The flow control receiver 9304A selects 9804 each buffer and performs the remaining steps in FIG. 14 in parallel for each buffer. The BSM receiver 9306A in the flow control receiver 9304A determines 9806 if the bit associated with each buffer in the SANRR 9308A is equal to a logical one. If SANRR 9308A is equal to a logical one, then the BSM receiver 9306A determines 9808 if the bit associated with each buffer in the NMTSR 9318B portion of the BSM is equal to a logical one. If NMTSR=1, then SANRR 9308A is set 9810 equal to a logical zero and the process continues at step 9812. If the value in SANRR 9308A is equal to a logical zero or if the value of NMTSR 9318B is equal to a logical zero then the process continues at step 9812. In step 9812 each bit in the RCFR 9310A is set 9812 equal to the associated bit in the CFR 9320B if the BSM represents both the NMTSR 9318B and the CFR 9320B. If the BSM represents only the NMTSR 9318B, the BSM receiver 9306A sets 9812 the RCFR 9310A equal to the associated bit in the NMTSR 9318B portion of the BSM. The BSM receiver 9306A then sets 9814 each bit in the BBR 9312A equal to the logical OR of the associated bit in the SANRR 9308A and the RCFR 9310A.

FIGS. 9(a)–9(g) are examples of register values according to an aspect of the present invention. In FIG. 15, the three registers labeled RCFR 9310A, SANRR 9308A, and BBR 9312A, correspond to the values of these registers in the flow control receiver 9304A in the first router 9104A when packets are sent from the first router 9104A to the second router 9104B. The two registers labeled CFR 9320B and NMTSR 9318B correspond to the values of these registers in the flow control transmitter 9305B in the second router 9104B when packets are sent from the first router 9104A to the second router 9104B. FIG. 15(a) illustrates the values of the registers when the routers 9104 are initialized. As indicated in the state diagrams in FIG. 10 and FIG. 11, the values in the RCFR 9310A and BBR 9312A are set equal to a logical one while the values in the remaining registers are set equal to a logical zero. The flow control transmitter 9305B generates a first BSM and transmits it to the flow control receiver 9304A, as described above. The values of the registers after receiving the first BSM is shown in FIG. 15(b). The first BSM is equal to either BSM=0,0 or BSM=0, depending upon the size of the first BSM. In either situation, the registers in the flow control receiver 9304A transition from state III to state I. The remaining portion of this example involves the first buffer in the port 6 buffer array 9322B, or the buffer associated with the tag 001, as described above. The first router 9104A transmits a packet to the second router 9104B. The status of the registers after the packet transmission is shown in FIG. 15(c). In FIG. 15(c), the SANRR 9308A is set equal to a logical one because the first router 9104A has sent a packet but has not received an acknowledge signal. Since the SANRR 9308A is set to a logical one, the BBR 9312A is also set equal to a logical one.

After the packet has been received by the port 6 buffer array 9322B, and the flow control transmitter has updated the NMTSR 9318B and the RCFR 9320B, the values of the register values are shown in FIG. 15(d). In FIG. 15(d), the values of the SANRR 9308A, RCFR 9310A, and the BBR 9312A have not changed because no BSM was received by the flow control receiver 9304A. However, the first bit in the NMTSR 9318B is equal to a logical one because data was received by the port 6 buffer array 9322B since the first BSM was sent. Since the first buffer is not empty, the first bit in the CFR 9320B is also set equal to a logical one. However, before a second BSM is transmitted, the packet is transmitted to the third router 9104E and the first buffer becomes empty. Therefore, the value of the CFR 9320B when the second BSM is generated is equal to a logical zero. This is shown in FIG. 15(e). When the register values are as shown in FIG. 15(e), the flow control transmitter 9305B generates and transmits a second BSM.

If the second BSM includes both the NMTSR 9318B and the CFR 9320B, the values of the registers in the flow control receiver 9304A after receiving the second BSM are shown in FIG. 15(g). In FIG. 15(g) the value of all bits in the SANRR 9308A, RCFR 9310A, and BBR 9312A are equal to a logical zero. The values of the registers in the flow control transmitter 9305B are also all equal to a logical zero because the value of the CFR 9320B is stored in the NMTSR 9318B. This is equivalent to the registers in the flow control receiver 9304A transitioning from state II to state I in FIG. 10. If the second BSM includes only the NMTSR 9318B, the value of the register after the flow control receiver 9304A receives the second BSM is shown in FIG. 15(f). This is equivalent of the registers in the flow control receiver 9304A transitioning from state II to state III in FIG. 11. At a later time, the flow control transmitter 9305B will generate and transmit a third BSM that includes only the NMTSR 9318B values. After receiving the third BSM, the values of the registers are as shown in FIG. 15(g). This is equivalent of the registers in the flow control receiver 9304A transitioning from state III to state I in FIG. 11.

What is claimed is:

1. A method for coordinating access to an output of a first routing device in a packet switching network, wherein a data packet granted access to the output is transmitted to a receiving input buffer of a second routing device, the method comprising the steps of:

receiving at least one request from a data packet to access the output;

selecting a request, the request having a priority level;

receiving an indication of the capacity of the receiving input buffer;

determining from the capacity of the receiving input buffer a minimum priority level the selected request must have to be granted;

determining whether the priority level of the selected request is at least as high as the minimum priority level;

in response to determining that the priority level of the selected request is at least as high as the minimum priority level, granting the selected request; and in response to determining that the priority level of the selected request is not as high as the minimum priority level, not granting the selected request.

2. An apparatus for coordinating access to an output of a first routing device in a packet switching network, wherein a data packet granted access to the output is transmitted to a receiving input buffer of a second routing device, the apparatus comprising:

a memory device for receiving and storing a request to access the output; and a controller coupled to the memory device and configured to select a request to be granted, the selected request having a priority level; receive an indication of a minimum priority level the selected request must have to be granted; determine whether the priority level of the selected request is at least as high as the minimum priority level; and grant the selected request in response to the priority level of the selected request being at least as high as the minimum priority level.

3. The apparatus of claim 2, wherein a data packet granted access to the output is transmitted to a receiving input buffer in a second routing device and wherein the minimum priority level is a number of priority levels lower than a highest priority level, the number of priority levels lower being equal to one less than a maximum number of data packets the receiving input buffer has capacity to receive.

4. A method for coordinating access to an output of a routing device in a packet switching network, the method comprising the steps of:

receiving at least one request from a data packet to access the output;

selecting a request to be granted, the selected request having a priority level;

receiving an indication of a minimum priority level the selected request must have to be granted;

determining whether the priority level of the selected request is at least as high as the minimum priority level; and granting the selected request in response to the priority level of the selected request being at least as high as the minimum priority level.

5. The method of claim 4, wherein a data packet granted access to the output is transmitted to a receiving input buffer in a second routing device and wherein the minimum priority level is a number of priority levels lower than a highest priority level, the number of priority levels lower being equal to one less than a maximum number of data packets the receiving input buffer has capacity to receive.

6. A method for coordinating access to an output of a routing device in a packet switching network, wherein the routing device includes a flow control receiver unit and an arbiter and wherein a data packet granted access to the output is transmitted to a receiving input buffer in a second routing device having a flow control transmitter unit, the method comprising the steps of:

receiving at the arbiter at least one request from a data packet to access the output;

selecting at the arbiter a request to be granted, the request having a priority level;

determining at the flow control transmitter unit a maximum number of data packets the receiving input buffer has capacity to receive;

transmitting a first signal from the flow control transmitter unit to the flow control receiver unit, the first signal indicative of the maximum number of data packets the receiving input buffer has capacity to receive;

receiving the first signal at the flow control receiver unit;

in response to receiving the first signal and in response to the first signal indicating that the receiving input buffer has capacity to receive at least one data packet, generating at the flow control receiver unit a second signal indicating a minimum priority level required for a request to be granted;

sending the second signal from the flow control receiver unit to the arbiter;

in response to receiving the second signal, determining whether the priority of the selected request is at least as high as the minimum priority level required for a request to be granted; and in response to determining that the priority of the selected request is at least as high as the minimum priority level required for a request to be granted, granting the request.

7. The method of claim 6, wherein the minimum priority level is a number of priority levels lower than a highest priority level, the number of priority levels lower being equal to one less than the maximum number of data packet the receiving input buffer has capacity to receive.

8. A routing device for routing data packets through a packet switching network, the routing device comprising:

an arbiter coupled to an output of the routing device, for receiving at least one request to access the output and for selecting a request to be granted access to the output;

a flow control receiver unit coupled to the arbiter for receiving an indication of the capacity of a destination routing device and for sending to the arbiter an indication, based on the capacity of the destination routing device, of a minimum priority level the request must have to be granted;

a receiving input buffer coupled to the output and an input of the routing device, for receiving a data packet; and a flow control transmitter unit coupled to the receiving input buffer, for generating a signal indicative of a number of data packets the receiving input buffer has capacity to receive.

9. A method for coordinating access to an output of a routing devices with an arbiter having a plurality of memory devices and a controller, the method comprising the steps of:

receiving at least one request to access the output at one of the plurality of memory devices;

in response to receiving at least one request, storing information in each of the plurality of memory devices, the information in each of the plurality of memory devices receiving a request being an indication that a request has been received and the information in each of the plurality of memory devices not receiving a request being an indication that a request has not been received;

receiving the information stored in each of the plurality of memory devices at the controller, the information being received at the controller in an order stored by the plurality of memory devices and all information stored concurrently by the plurality of memory devices being received concurrently at the controller; and selecting a request to be granted at the controller from the received information.

10. The method of claim 1, wherein, in response to the input buffer having capacity to receive only one data packet, the minimum priority level is determined to be the highest priority level which can be assigned to a data packet.

* * * * *